United States Patent
Ishige

(10) Patent No.: US 9,740,066 B2
(45) Date of Patent: Aug. 22, 2017

(54) DISPLAY DEVICE

(71) Applicant: Japan Display Inc., Minato-ku (JP)

(72) Inventor: Nobuyuki Ishige, Tokyo (JP)

(73) Assignee: Japan Display Inc., Minato-ku (JP)

( * ) Notice: Subject to any disclaimer, the term of this patent is extended or adjusted under 35 U.S.C. 154(b) by 87 days.

(21) Appl. No.: 14/954,024

(22) Filed: Nov. 30, 2015

(65) Prior Publication Data

US 2016/0161815 A1   Jun. 9, 2016

(30) Foreign Application Priority Data

Dec. 3, 2014   (JP) ................................. 2014-245419

(51) Int. Cl.
*G02F 1/1345* (2006.01)
*G02F 1/1333* (2006.01)

(52) U.S. Cl.
CPC ........ *G02F 1/1345* (2013.01); *G02F 1/13452* (2013.01); *G02F 1/133345* (2013.01)

(58) Field of Classification Search
CPC ............. G02F 1/1345; G02F 1/133345; G02F 1/13452
See application file for complete search history.

(56) References Cited

U.S. PATENT DOCUMENTS

| 2012/0257135 | A1* | 10/2012 | Chen | .................. G02F 1/13452 349/56 |
| 2012/0281369 | A1* | 11/2012 | Chen | ................. G02F 1/133345 361/748 |
| 2015/0219944 | A1* | 8/2015 | Mitsumoto | ........... G02F 1/1339 349/138 |
| 2015/0263043 | A1* | 9/2015 | Chen | .................. G02F 1/13452 257/72 |

FOREIGN PATENT DOCUMENTS

JP   2007-164219   6/2007

* cited by examiner

*Primary Examiner* — Nathanael R Briggs
(74) *Attorney, Agent, or Firm* — Oblon, McClelland, Maier & Neustadt, L.L.P.

(57) ABSTRACT

A circuit section of a display device is provided with a display element section on which a plurality of display elements are arranged at positions overlapped with a display region on which a display functional layer is formed, an input section for transmitting a signal for driving the display functional layer to the display element section and a lead-out wiring section for electrically connecting the display element section to the input section. Moreover, the lead-out wiring section is provided with a plurality of stacked wiring layers, and the plurality of wiring layers include a first wiring layer on which a plurality of first wirings having a first wiring width and a second wiring layer on which a plurality of second wirings having a first wiring width that is narrower than the first wiring width are formed.

12 Claims, 14 Drawing Sheets

DISPLAY DEVICE

CROSS-REFERENCE TO RELATED APPLICATION

The present application claims priority from Japanese Patent Application No. 2014-245419 filed on Dec. 3, 2014, the content of which is hereby incorporated by reference into this application.

TECHNICAL FIELD OF THE INVENTION

The present invention relates to a display device and also concerns, for example, a technique effectively applicable to a display device provided with a plurality of lead-out wirings for use in transmitting signals to a plurality of display elements formed in a display region.

BACKGROUND OF THE INVENTION

A display device has been proposed in which signals are transmitted to a plurality of display elements formed in a display region through a plurality of lead-out wirings so as to display an image thereon.

For example, Japanese Patent Application Laid-Open Publication No. 2007-164219 (Patent Document 1) has described a technique in which a plurality of gate connection lines to be connected to a plurality of gate lines formed in a pixel region are formed on a plurality of wiring layers.

RELATED ART DOCUMENT

Patent Document

Patent Document 1: Japanese Patent Application Laid-Open Publication No. 2007-164219

SUMMARY OF THE INVENTION

A display device is provided with a display functional layer, such as, for example, a liquid crystal layer or a light emitting layer in which electroluminescence is utilized. Moreover, the display device has a plurality of display elements, such as transistors or the like, formed in a display region. In the display device, signals are transmitted to the plurality of display elements so that by driving the display elements, an image is displayed thereon.

In order to transmit signals to the plurality of display elements, a large number of signal lines are required. The number of the signal lines is increased as a high definition display image is achieved. Moreover, with respect to the display device, there has been a demand for a technique for reducing the area of a peripheral region that is a non-display portion surrounding the periphery of the display region, or a portion referred to as a frame region. In the frame region, lead-out lines that are connected to the signal lines and supply signals to the signal lines are formed. In other words, in order to improve performances of the display device, the large number of lead-out lines need to be effectively laid out in the frame region.

Therefore, the inventor of the present application has examined a technique in which by assigning a large number of lead-out lines on a plurality of wiring layers formed by stacking them with insulating film interposed therebetween so as to be formed thereon, the wiring density of the lead-out lines is improved, and have found the following problems. Additionally, the lead-out lines are connected to the signal lines of the display region, and also considered to form one portion of the signal lines; therefore, in the following description, the lead-out lines are referred to also as the signal lines.

That is, upon stacking the plurality of signal lines, the respective signal lines interfere with each other to form a causative factor of being influenced by noises. Moreover, it has been found that in the case when designing rules for regulating the minimum values of the wiring width and the wiring clearance (distance) are different from each other for the respective wiring layers due to the manufacturing process or the like, if the wiring formed on a wiring layer of the upper layer and the wiring formed on a wiring layer of the lower layer are disposed so as to be alternately arranged, the wiring density of the signal lines cannot be sufficiently improved in some cases.

A preferred aim of the present invention is to provide a technique for efficiently arranging a plurality of wirings in a frame region of a display device.

A display device according to one embodiment of the present invention is provided with: a substrate having a first surface; a display functional layer formed on the first surface of the substrate; and a circuit section that is formed on the first surface of the substrate so as to drive the display functional layer. The first surface includes a display element section on which a plurality of display elements for driving the display functional layer are arranged, an input section to which a signal to be supplied to the display element section is input, and a lead-out wiring section for electrically connecting the display element section to the input section, and the lead-out wiring section includes a plurality of wiring layers stacked with an insulating film interposed therebetween. The plurality of wiring layers include a first wiring layer on which a plurality of first wirings, each having a first wiring width, are formed, and a second wiring layer on which a plurality of second wirings, each having a second wiring width narrower than the first wiring width, are formed, and the number of the plurality of second wirings is greater than the number of the plurality of second wirings.

Further, as another embodiment of the present invention, the first surface of the substrate has a first side extending along a first direction, a second side positioned on the opposite side of the first side, a third side extending along a second direction that is orthogonal to the first direction, and a fourth side positioned on the opposite side of the third side. The input section and the lead-out wiring section are formed from the first side in this order between the first side and the display element section of the substrate, and the length of the input section in the first direction is shorter than the length of the display element section in the first direction.

Further, as another embodiment of the present invention, the first surface of the substrate has a first side extending along a first direction, a second side positioned on the opposite side of the first side, a third side extending along a second direction that is orthogonal to the first direction, and a fourth side positioned on the opposite side of the third side. The lead-out wiring section includes: a first portion on which, between the display element section and the input section, the plurality of lead-out wirings including the plurality of first wirings and the plurality of second wirings extend along the second direction; a second portion on which, between the first portion and the input section, the plurality of lead-out wirings extend along a third direction crossing the second direction and the first direction; and a third portion on which, between the second portion and the input section, the plurality of lead-out wirings extend along the second direction. The plurality of first wirings and the plurality of second wirings are not overlapped with each other when seen in a plan view.

Further, as another embodiment of the present invention, at the second portion of the lead-out wiring section, the plurality of first wirings are arranged with a first clearance, and the plurality of second wirings are arranged with a second clearance that is smaller than the first clearance.

Further, as another embodiment of the present invention, when seen in a plan view, among the plurality of first wirings, the plurality of second wirings are arranged between the adjacent first wirings.

Further, as another embodiment of the present invention, each of the plurality of display elements arranged in the display element section is a transistor having a gate electrode, and the gate electrode is formed on the same layer as the first wiring layer.

Further, as another embodiment of the present invention, the plurality of first wirings and the plurality of second wirings are formed of metal materials of mutually different kinds.

Further, as another embodiment of the present invention, the plurality of wiring layers further include a third wiring layer on which a plurality of third wirings, each having a third wiring width that is wider than the second wiring width, are formed and the number of the plurality of second wirings is greater than the number of the plurality of third wirings.

Further, as another embodiment of the present invention, a first insulating film is formed between the first wiring layer and the second wiring layer, and a second insulating film thicker than the first insulating film is formed between the second wiring layer and the third wiring layer. When seen in a plan view, the plurality of first wirings and the plurality of second wirings are not overlapped with each other. The plurality of third wirings are partially overlapped with the plurality of first wirings and the plurality of second wirings.

Further, as another embodiment of the present invention, when seen in a plan view, the plurality of first wirings and the plurality of second wirings are not overlapped with each other and the plurality of second wirings and the plurality of third wirings are not overlapped with each other, and the plurality of third wirings are overlapped with the plurality of first wirings.

Further, as another embodiment of the present invention, the first surface of the substrate has a first side extending along a first direction, a second side positioned on the opposite side of the first side, a third side extending along a second direction that is orthogonal to the first direction and a fourth side positioned on the opposite side of the third side, the lead-out wiring section includes: a first portion on which, between the display element section and the input section, a plurality of lead-out wirings, which include the plurality of first wirings, the plurality of second wirings and the plurality of third wirings, extend along the second direction; a second portion on which, between the first portion and the input section, the plurality of lead-out wirings extend along a third direction crossing the second direction and the first direction; and a third portion on which, between the second portion and the input section, the plurality of lead-out wirings extend along the second direction. A first insulating film as an inorganic insulating film is formed between the first wiring layer and the second wiring layer. A second insulating film as an organic insulating film is formed between the second wiring layer and the third wiring layer. On the third portion of the lead-out wiring section, an opening that extends along the first direction is formed in a manner so as to penetrate the second insulating layer in a thickness direction thereof.

A display device of another embodiment is provided with a substrate having a first surface; a display functional layer formed on the first surface of the substrate; and a circuit section formed on the first surface of the substrate so as to drive the display functional layer. The circuit section includes a display element section on which a plurality of display elements are arranged at a position overlapped with the display region on which the display functional layer is formed, an input section for transmitting a signal for driving the display functional layer to the display element section, and a lead-out wiring section for electrically connecting the display element section to the input section, and the lead-out wiring section includes a plurality of stacked wiring layers. The plurality of wiring layers include a first wiring layer on which a plurality of first wirings are formed with a first clearance, and a second wiring layer on which a plurality of second wirings are formed with a second clearance that is smaller than the first clearance. The number of the plurality of second wirings is greater than the number of the first wirings.

BRIEF DESCRIPTIONS OF THE DRAWINGS

Figure 1:
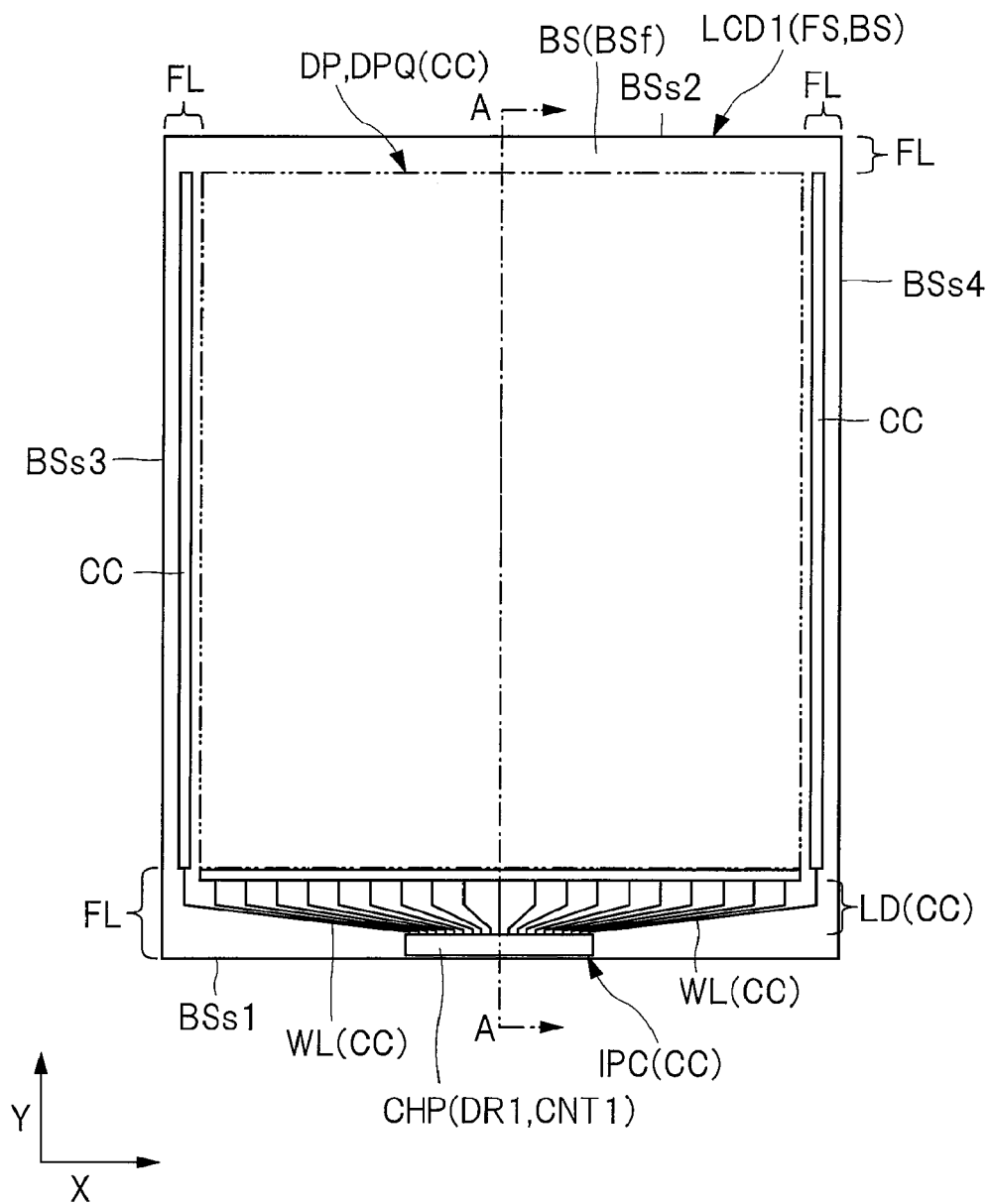
FIG. 1 is a plan view showing one example of a display device in accordance with an embodiment.
Figure 6:
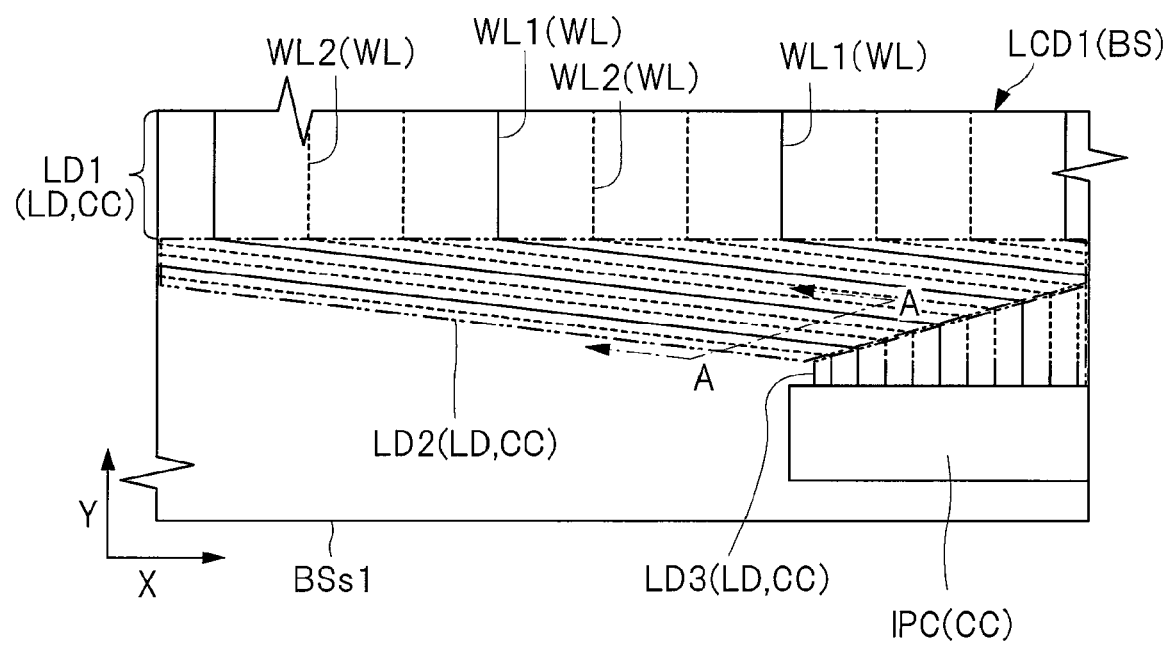
FIG. 6 is an enlarged plan view showing a layout example in the case when a plurality of wirings are routed by wiring layers of two layers in a lead-out wiring section shown in FIG. 1.
Figure 7:
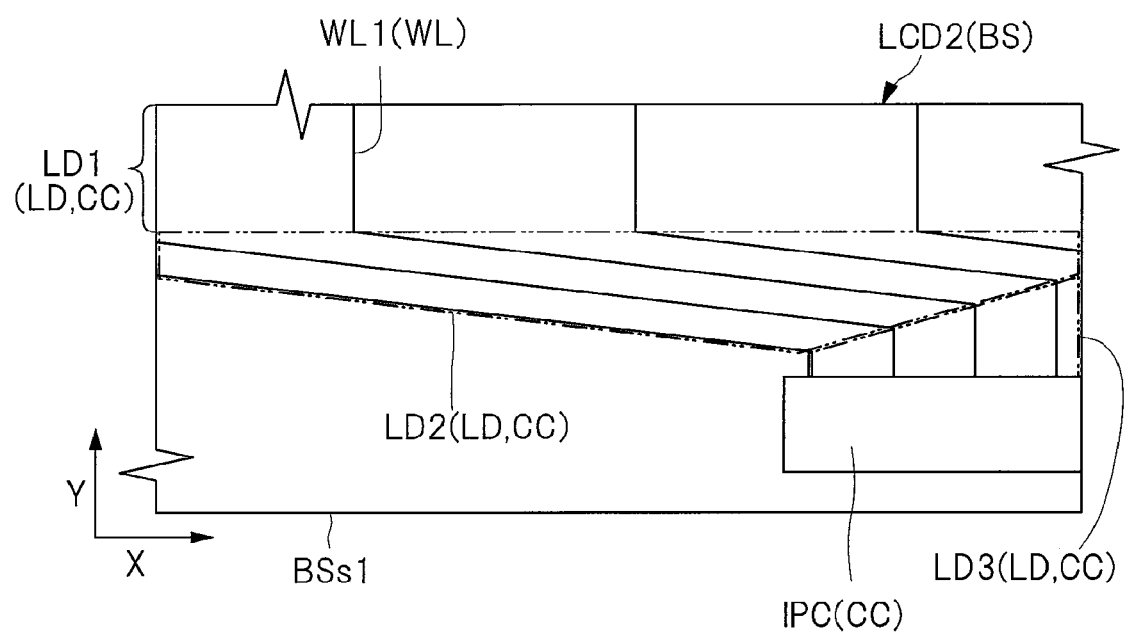
Figure 8:
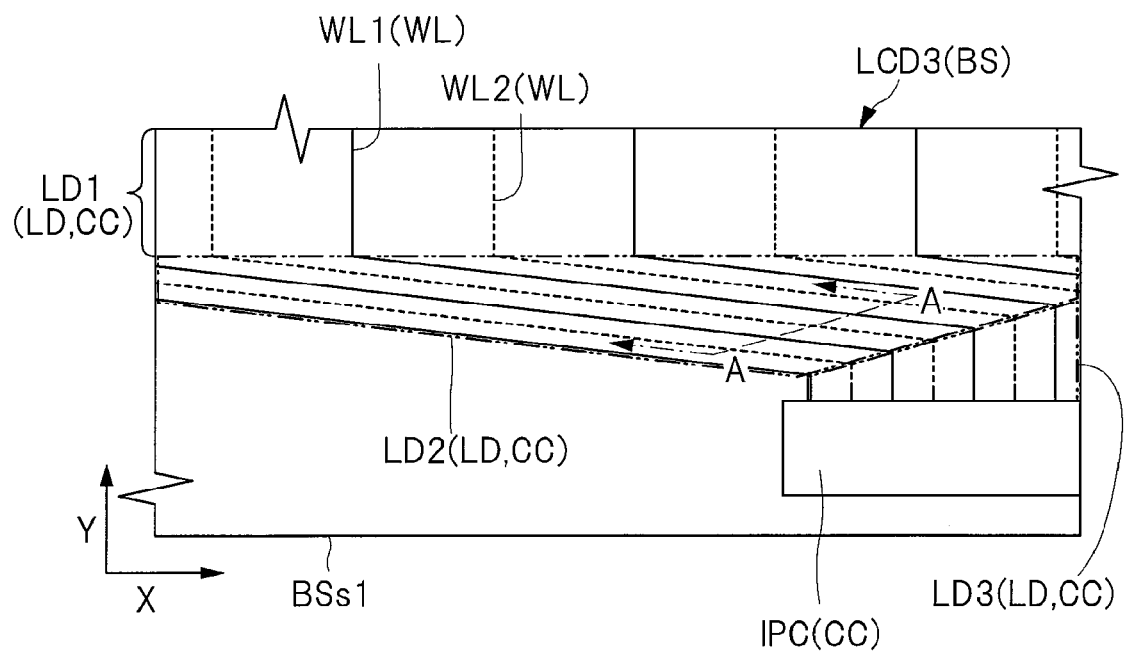
Figure 9:
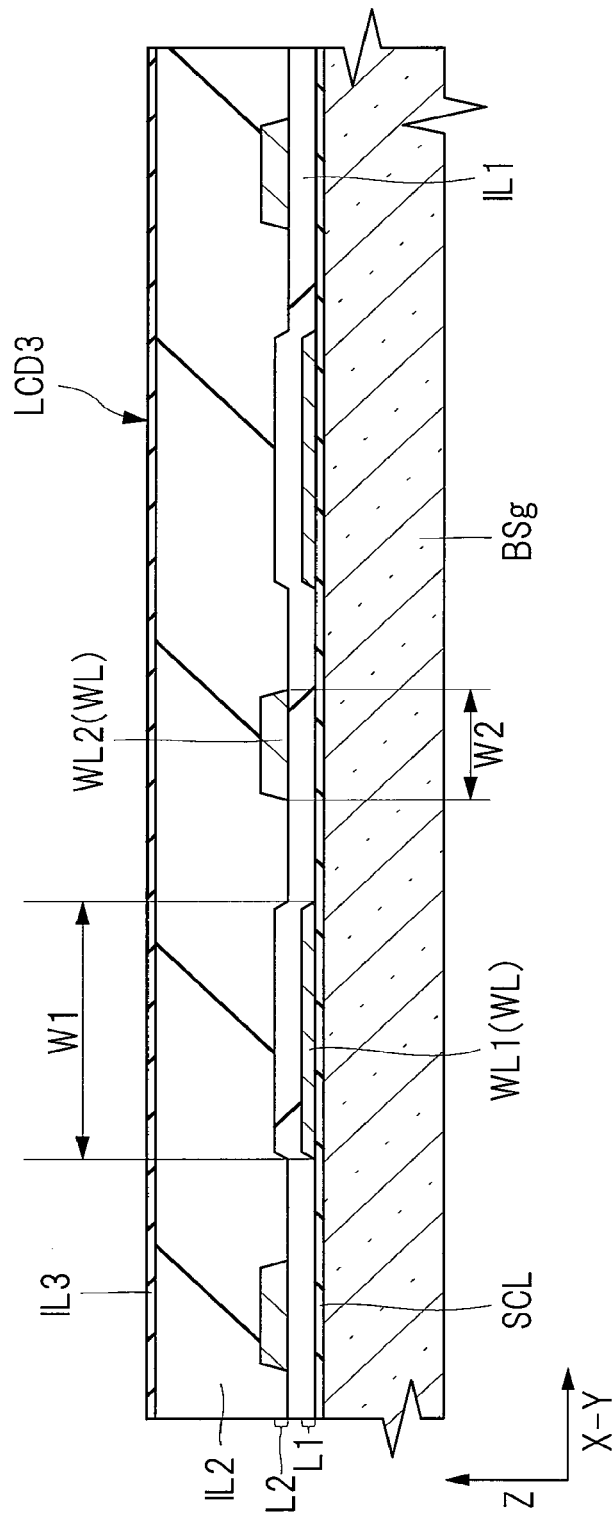
Figure 10:
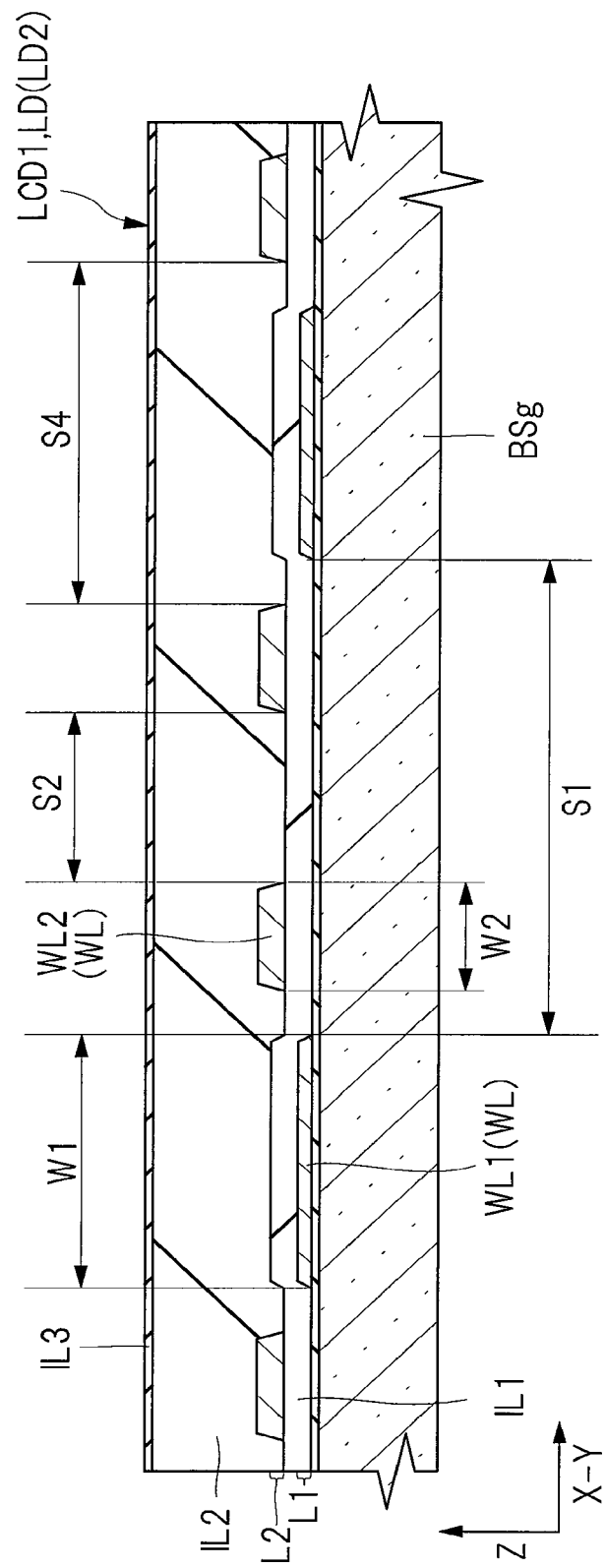
Figure 11:
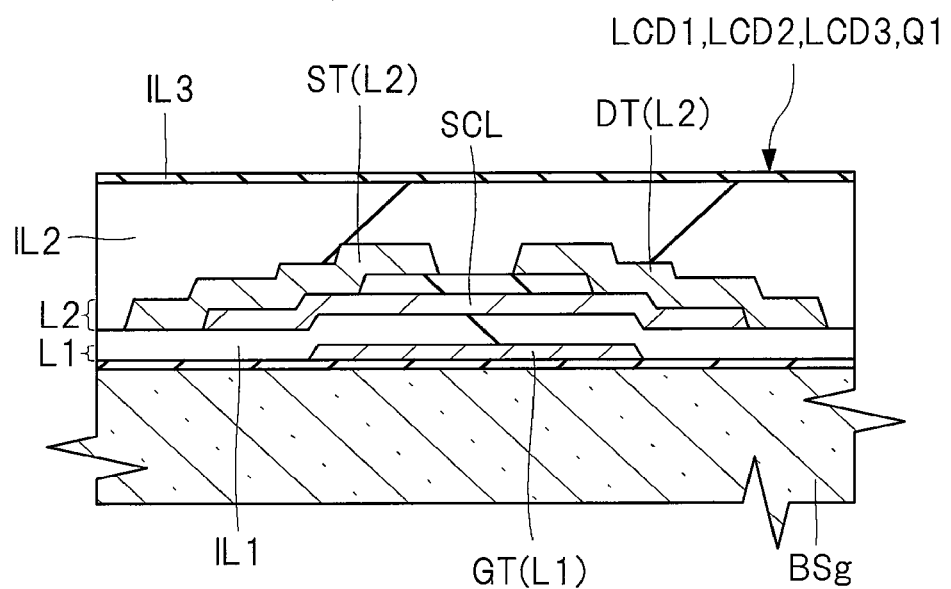
Figure 12:
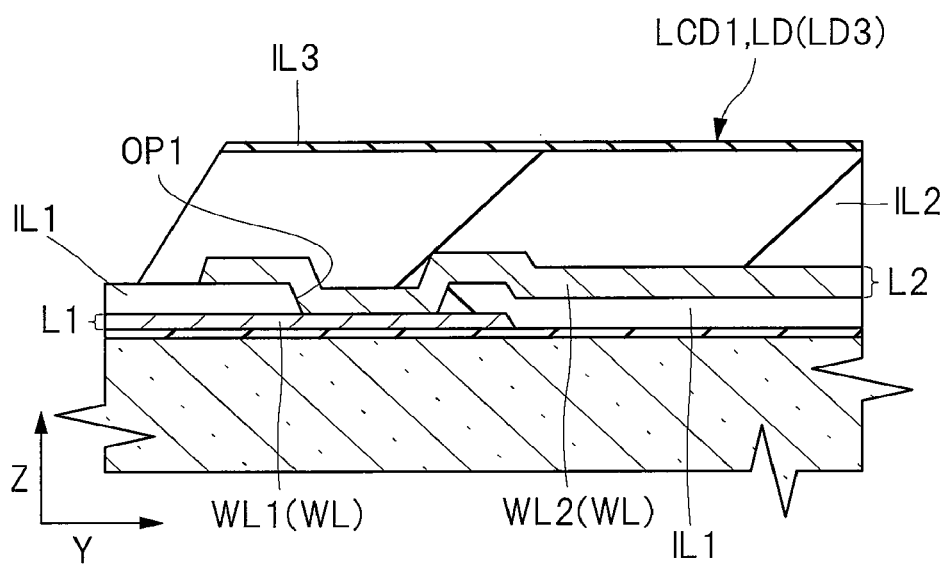
Figure 13:
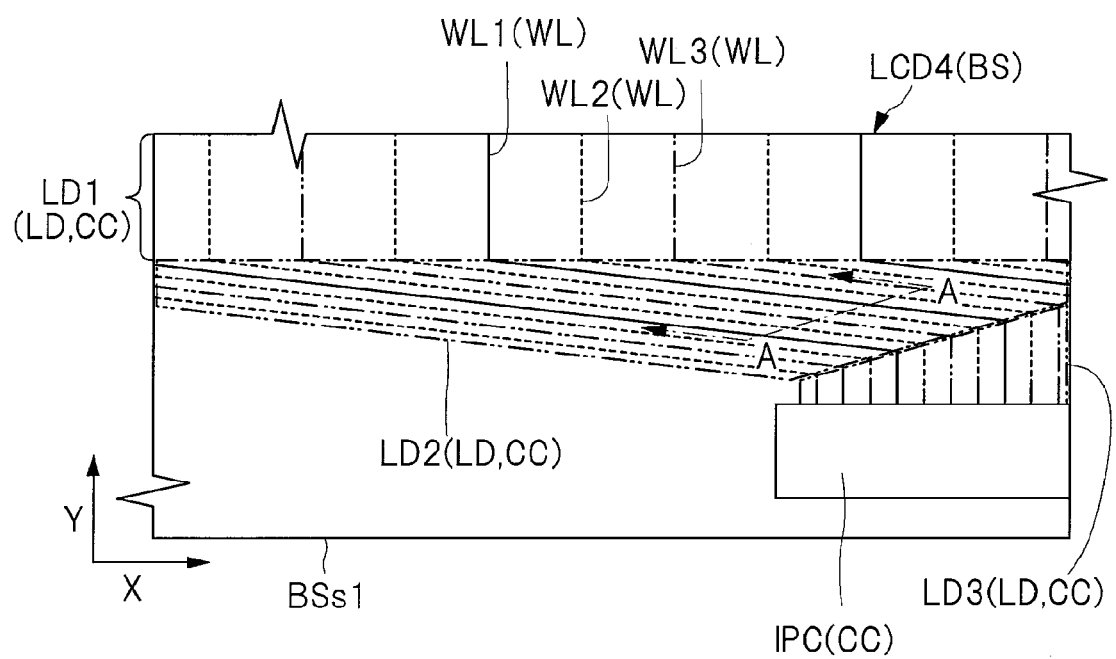
Figure 14:
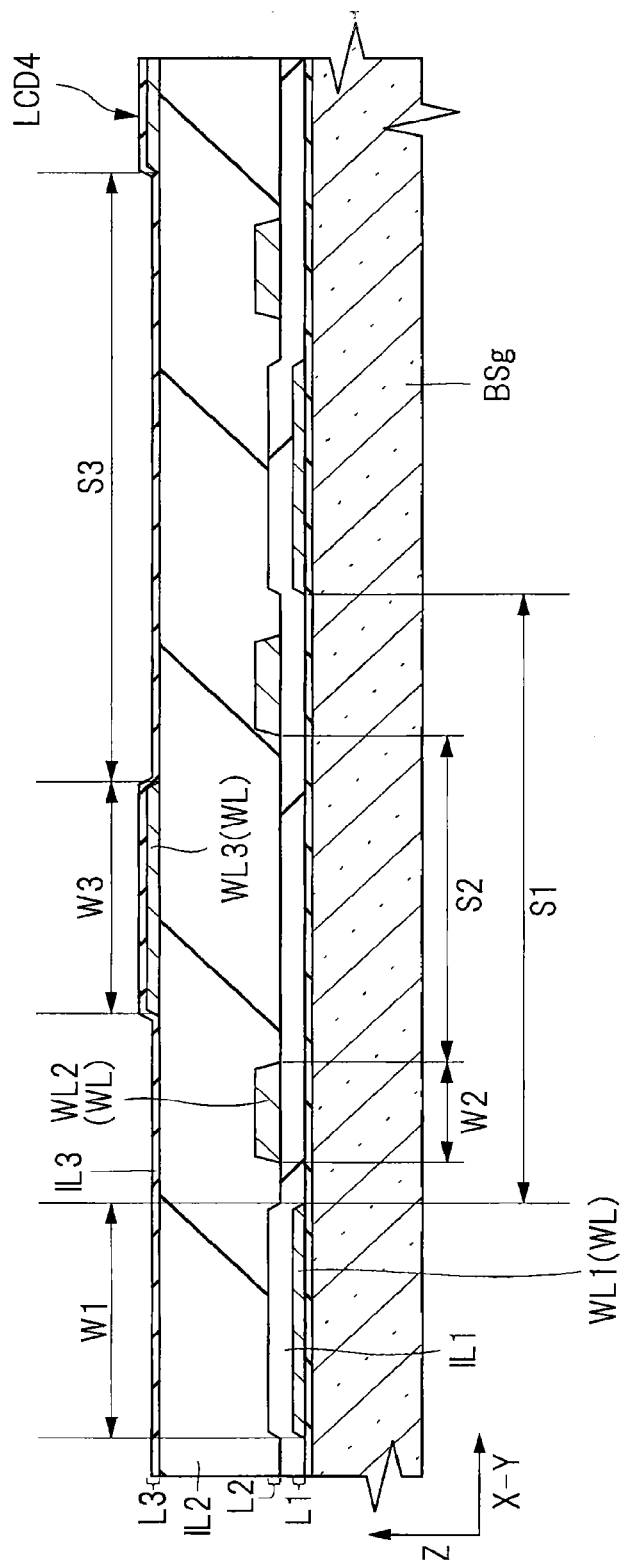
Figure 15:
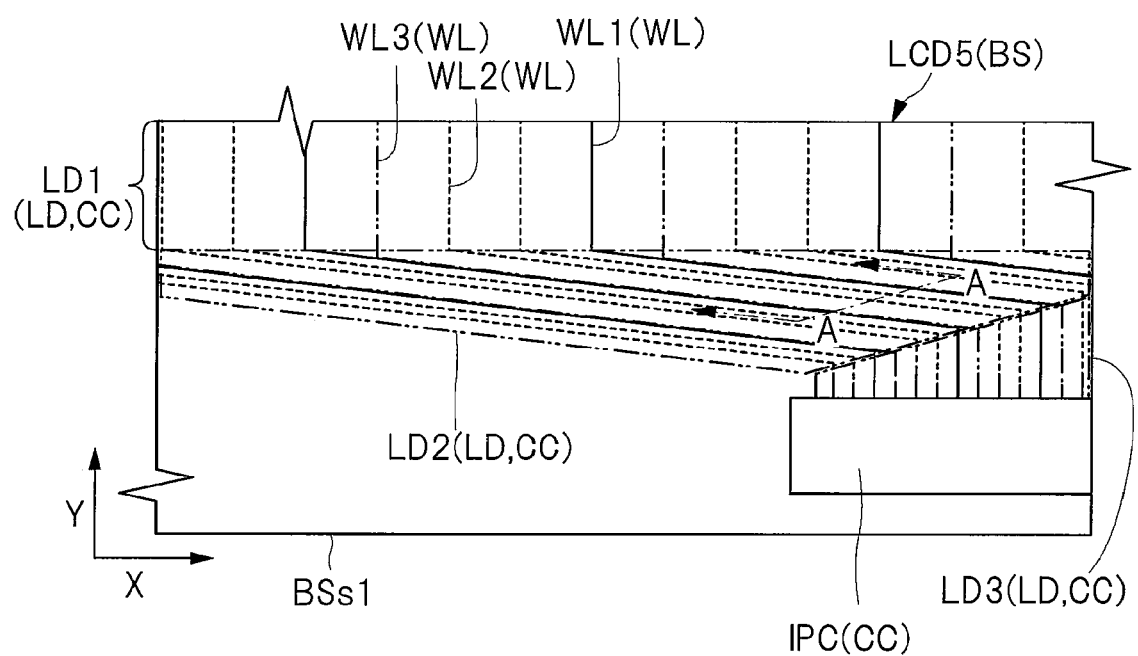
Figure 16:
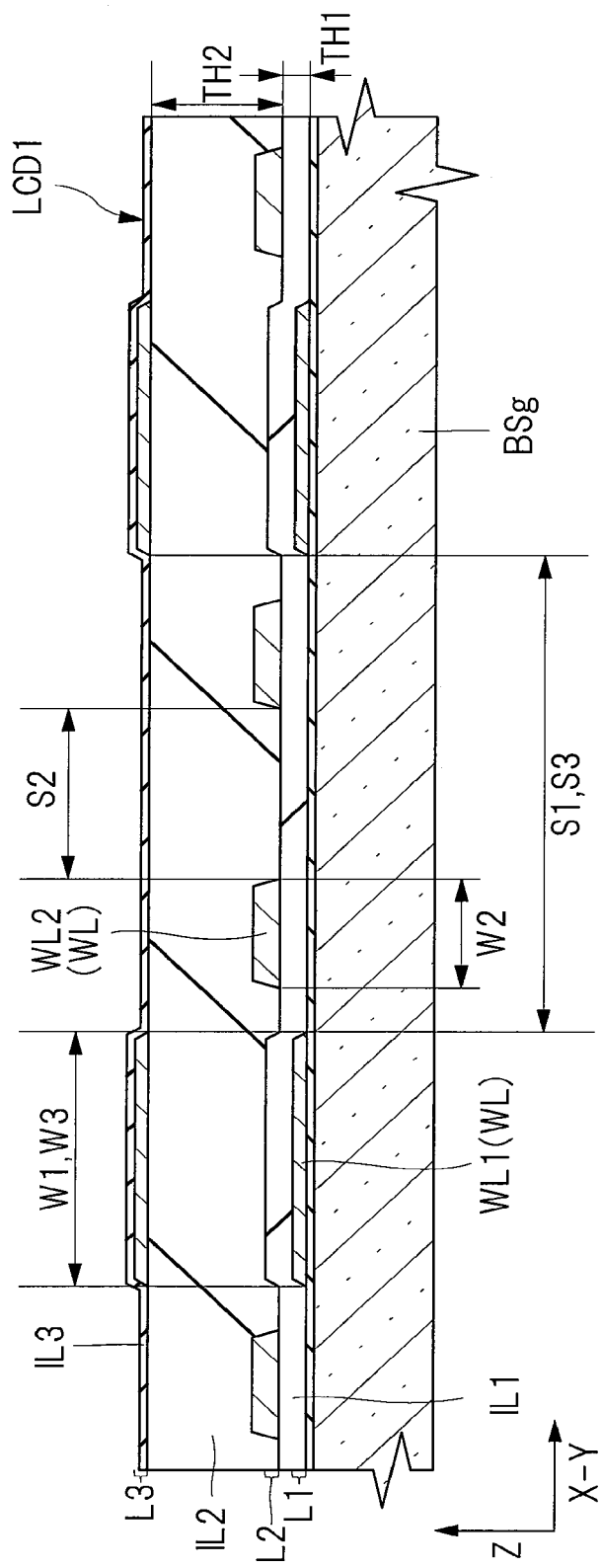
Figure 17:
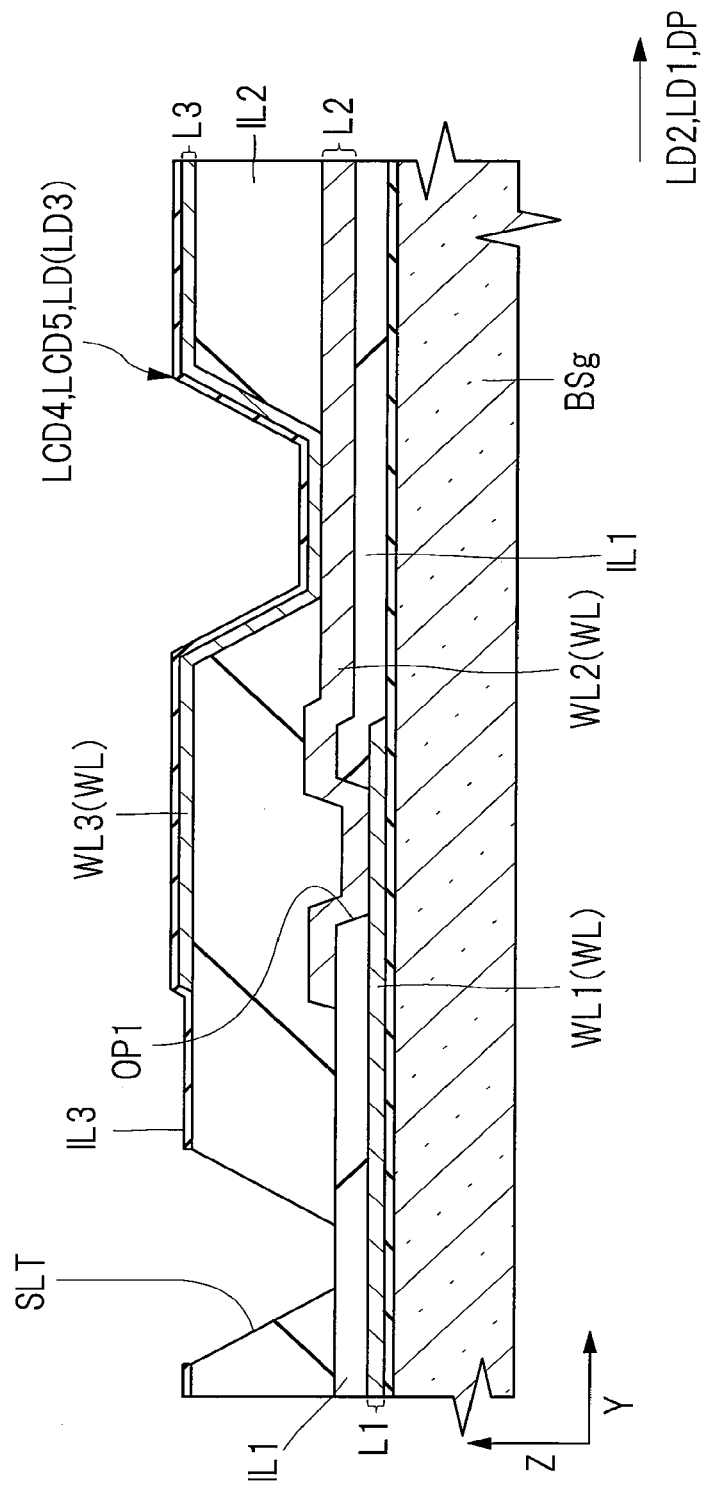

FIG. 7, which shows an examination example corresponding to FIG. 6, is an enlarged plan view showing a layout example in the case when a plurality of wirings are routed by a wiring layer of a single layer;

FIG. 8, which shows another examination example corresponding to FIG. 6, is an enlarged plan view showing a layout example in the case when a plurality of wirings are routed by wiring layers of two layers;

FIG. 9 is an enlarged cross-sectional view taken along the line A-A in FIG. 8;

FIG. 10 is an enlarged cross-sectional view taken along the line A-A in FIG. 6;

FIG. 11 is an enlarged cross-sectional view showing a structural example of a display element installed in the display element section shown in FIG. 1;

FIG. 12 is an enlarged cross-sectional view showing a structural example in which a wiring of a wiring layer of the first layer and a wiring layer of the second layer, shown in FIG. 6 and FIG. 10, are electrically connected;

FIG. 13, which shows a modification example relative to FIG. 6, is an enlarged plan view showing a layout example in the case when a plurality of wirings are routed by using wiring layers of three layers;

FIG. 14 is an enlarged cross-sectional view taken along the line A-A of FIG. 13;

FIG. 15, which shows a modification example relative to FIG. 13, is an enlarged plan view showing a layout example in the case when a plurality of wirings are partially overlapped with each other in the width direction;

FIG. 16 is an enlarged cross-sectional view taken along the line A-A of FIG. 15; and FIG. 17 is an enlarged cross-sectional view showing a structural example of a portion for use in electrically connecting wirings of a plurality of wiring layers in a display device shown in FIG. 13 and FIG. 15.

DESCRIPTIONS OF THE PREFERRED EMBODIMENTS

Hereinafter, embodiments of the present invention will be described with reference to the drawings. Note that the disclosures are provided by way of example, and any suitable variations easily conceived by a person with ordinary skill in the art while pertaining to the gist of the invention are of course included in the scope of the present invention. Further, in the drawings, widths, thicknesses and shapes of respective components may be schematically illustrated in comparison with the embodiments for the purpose of making the description more clearly understood, but these are merely examples, and do not limit the interpretations of the present invention. Further, in the specification and drawings, elements which are similar to those having been already mentioned with respect to previous drawings are denoted by the same reference characters, and detailed descriptions thereof will be suitably omitted.

Moreover, a technique to be described in the following embodiments is widely applicable to a display device having a mechanism in which signals are supplied to a plurality of elements in a display region on which a display functional layer is formed from the periphery of the display region. The above-mentioned display device is exemplified by various display devices, such as, for example, a liquid crystal display device, an organic EL (Electro-Luminescence) display device, or the like. In the following embodiments, descriptions will be given to the liquid crystal display as a representative example of display devices.

The liquid crystal display device is also broadly classified into two categories, to be described below, depending on an application direction of an electric field for changing an orientation of liquid crystal molecules in the liquid crystal layer as the display functional layer. More specifically, the first category is a so-called vertical electric field mode in which an electric field is applied in a thickness direction (or an out-of-plane direction) of the liquid crystal display device. Examples of the vertical electric field mode include a Twisted Nematic (TN) mode and a Vertical Alignment (VA) mode. The second category is a so-called horizontal electric field mode in which an electric field is applied in a planar direction (or an in-plane direction) of the liquid crystal display device. Examples of the horizontal electric field mode include an In-Plane Switching (IPS) mode and a Fringe Field Switching (FFS) mode as one type of the IPS mode. While a technique described below is applicable to both the vertical electric field mode and the horizontal electric field mode. However, a display device in the horizontal electric field mode will be described as an example in the present embodiment.

<Basic Configuration of Display Device>

Figure 2:
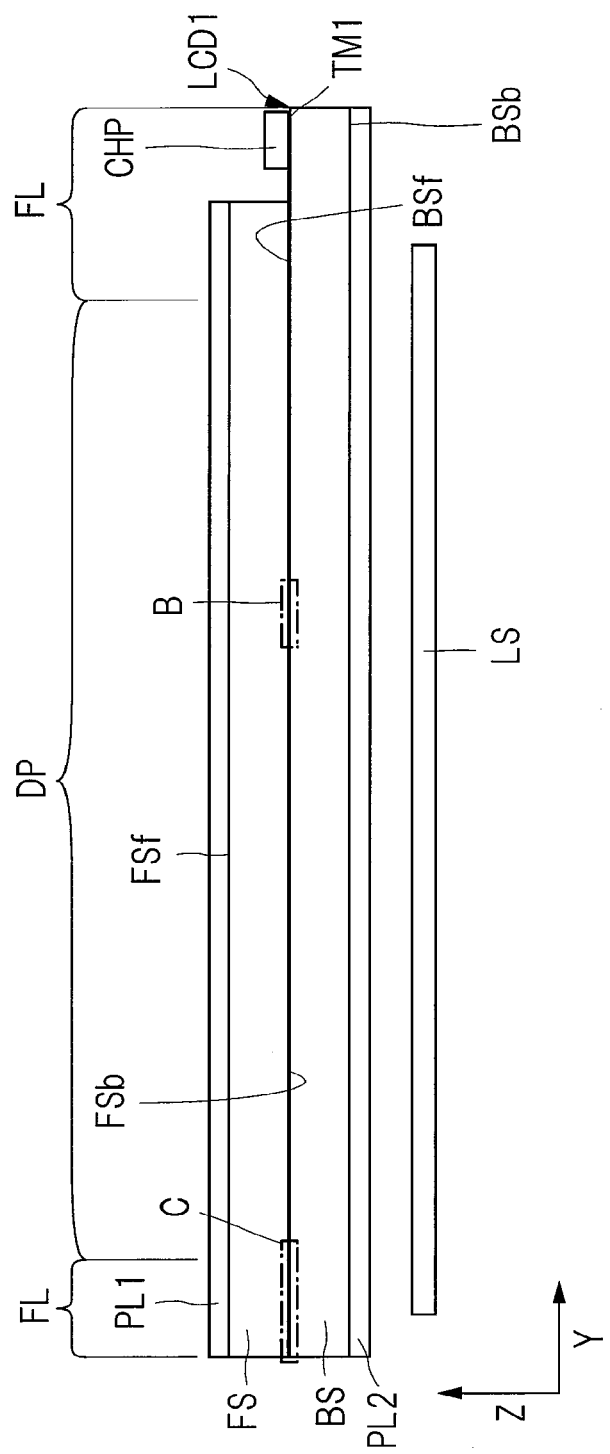
FIG. 2 is a cross-sectional view taken along the line A-A of FIG. 1.
Figure 3:
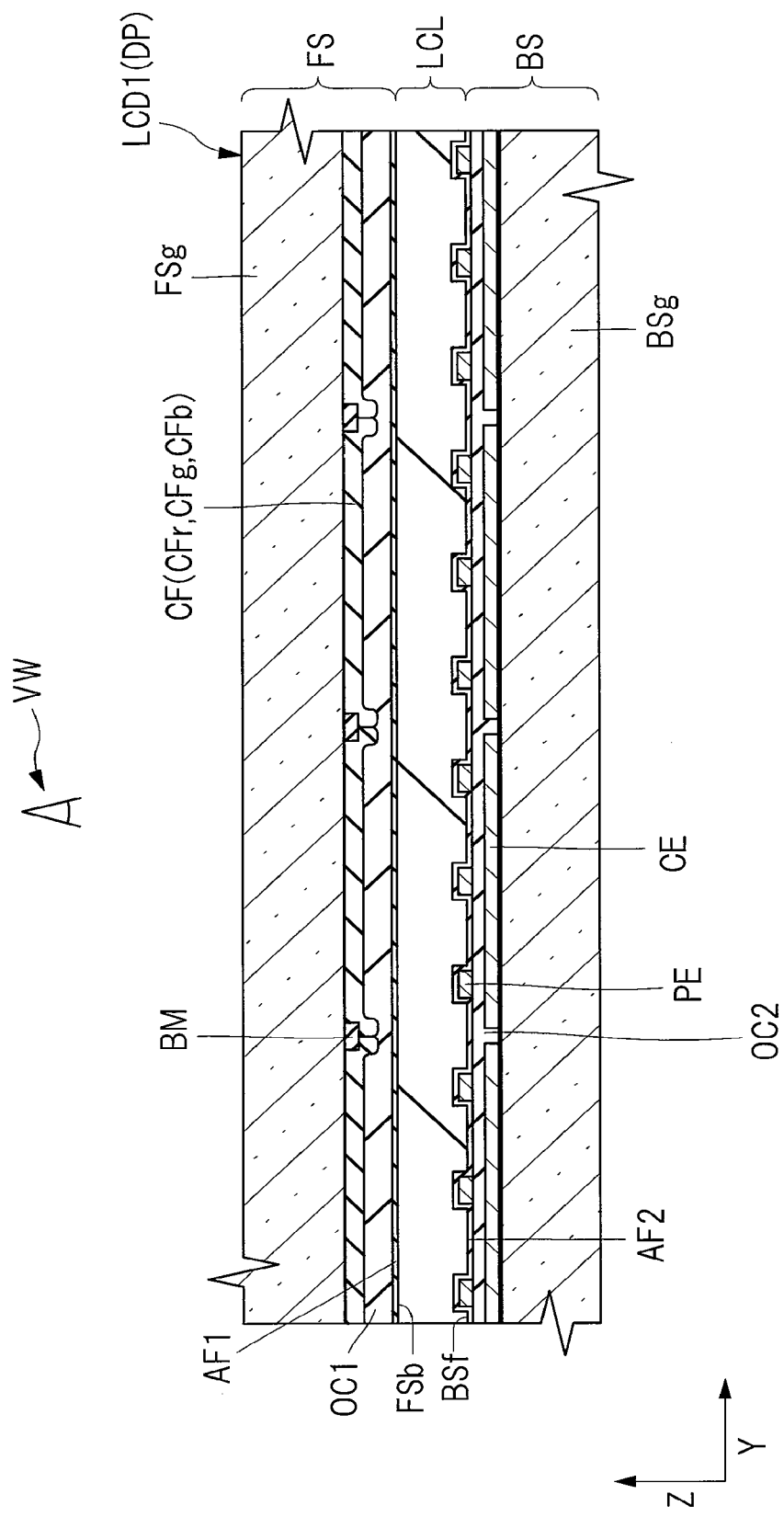
FIG. 3 is an enlarged cross-sectional view showing a B portion of FIG. 2.
Figure 4:
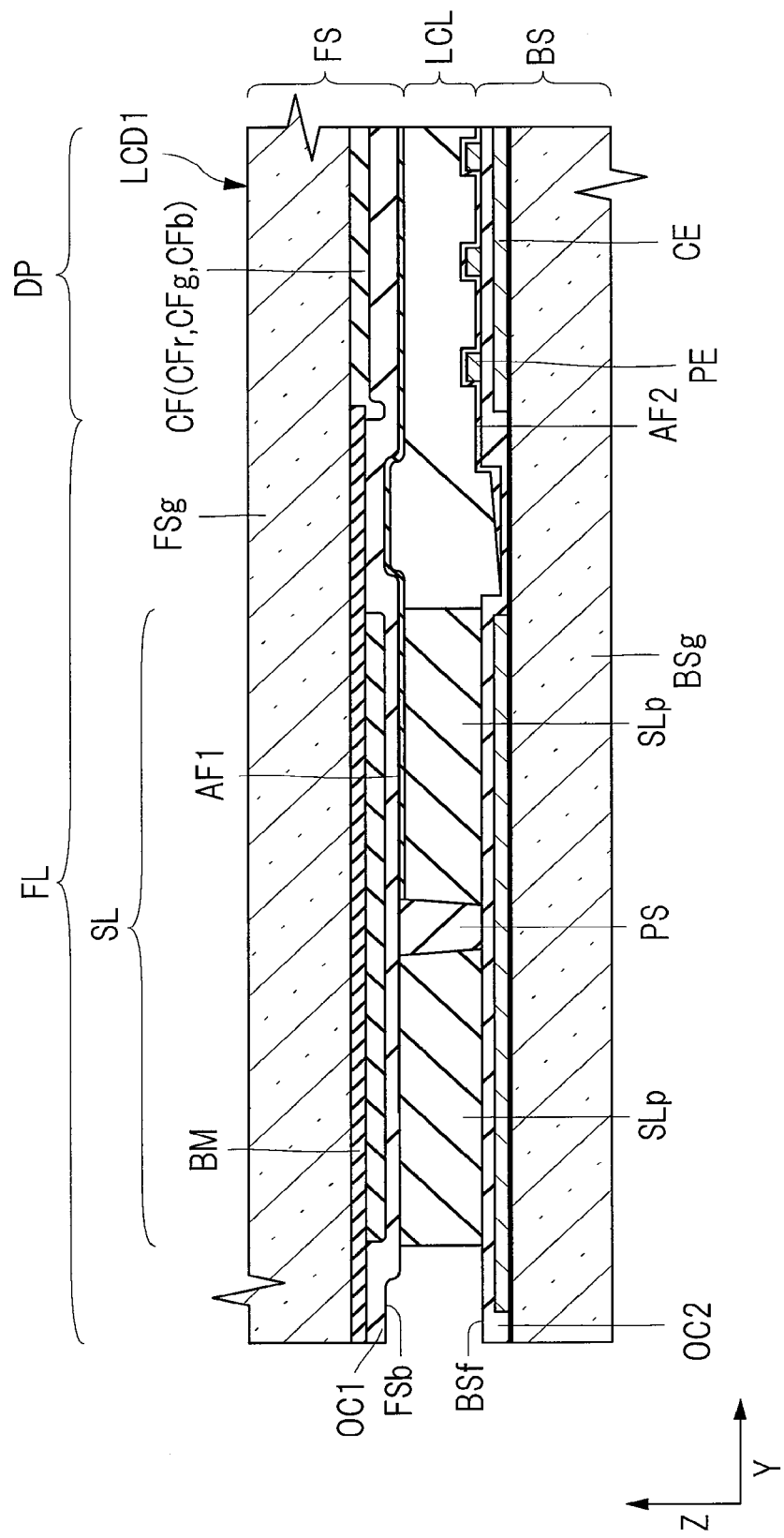
FIG. 4 is an enlarged cross-sectional view showing a C portion of FIG. 2.

First, the following description will discuss a basic configuration of a display device. FIG. 1 is a plan view showing one example of a display device of the present embodiment, and FIG. 2 is a cross-sectional view taken along the line A-A of FIG. 1. Moreover, FIG. 3 is an enlarged cross-sectional view showing a B portion of FIG. 2. FIG. 4 is an enlarged cross-sectional view showing a C portion of FIG. 2.

Additionally, in FIG. 1, in order to make a border between a display section DP and a frame region (peripheral portion) FL easily recognizable in a plan view, the contour of the display section DP is indicated by a two-dot chain line. Moreover, a plurality of wirings WL shown in FIG. 1 extend from the peripheral region of the display section DP to a region overlapped with the display section DP. However, for easiness of visual recognition, in FIG. 1, the illustration of the wirings WL is omitted in the region where they are overlapped with the display section DP. Furthermore, in FIG. 2 that is a cross-sectional view, hatching is omitted for easiness of visual recognition.

As shown in FIG. 1, a display device LCD1 in the present embodiment is provided with the display section DP serving as a display region on which a visually recognizable image from the outside is formed in accordance with an input signal. Moreover, the display device LCD1 is provided with the frame region FL as a non-display region formed on the periphery of the display section DP with a frame shape when seen in a plan. Additionally, the display region of the present display device has a rectangular shape; however, the display region may have a polygonal shape or a round shape. Furthermore, the display region may be extended close to the end portion of the display device. In this case, the peripheral region of the display region does not form a frame shape; however, even in this case, the peripheral region is referred to as a frame region.

Moreover, the display device LCD1 has a structure in which between a pair of substrates that are disposed opposite to each other, a liquid crystal layer as a display functional layer is formed. That is, as shown in FIG. 2, the display device LCD1 is provided with a substrate FS on the display surface side, a substrate BS positioned on the side opposite to the substrate FS, and a liquid crystal layer LCL (see FIG. 3) disposed between the substrate FS and the substrate BS.

The substrate BS shown in FIG. 1 is provided with a side BSs1 extending along an X direction when seen in a plan view, a side BSs2 that is opposite to the side BSs1, a side BSs3 extending along a Y direction that is orthogonal to the X direction and a side BSs4 that is opposite to the side BSs3. The distances from the side BSs2, side BSs3 and side BSs4 possessed by the substrate BS shown in FIG. 1 to the display section DP are set to the same level, which are shorter than the distance from the side BSs1 to the display section DP. Hereinbelow, in the present application, when described simply as "frame region of the substrate BS", this means any one of the side BSs1, side BSs2, side BSs3 and side BSs4 forming the outer edge of the substrate BS. Moreover, when described simply as "frame region", this means the frame region of the substrate BS.

Moreover, the liquid crystal layer LCL, which is formed on the display section DP shown in FIG. 1, is driven for each of pixels (more specifically, sub-pixels) in accordance with a signal applied to a circuit section CC.

The circuit section CC is connected to a display element section DPQ in which a plurality of display elements are arranged at a position overlapped with the display section DP. The plurality of display elements formed on the display element section DPQ are arranged in a matrix form for each of the pixels (more specifically, sub-pixels), and carry out switching operations. In the present embodiment, each of the plurality of display elements is prepared as a transistor referred to as TFT (Thin-Film Transistor) formed on the substrate.

Moreover, the circuit section CC includes a plurality of wirings WL that are formed on the frame region FL on the periphery of the display section DP, and electrically connected to the plurality of display elements of the display element section DPQ. Furthermore, the circuit section CC, which drives the display functional layer, includes an input section IPC that is electrically connected to the display element section DPQ, and inputs a driving signal and a video signal to the plurality of display elements of the display element section DPQ through the plurality of wirings WL. In the example shown in FIG. 1, in the input section IPC, a semiconductor chip CHP on which a driving circuit DR1 for use in displaying images and a control circuit CNT1 are formed is installed.

Moreover, in the example shown in FIG. 1, the input section IPC is installed between the side BSsi of the substrate BS and the display section DP within the frame region FL of the display device LCD1. Furthermore, between the side BSs1 and the display section DP, a lead-out wiring section LD with the plurality of wirings WL formed thereon is installed. The display element section DPQ and the input section IPC are electrically connected with each other through the lead-out wiring section LD. The detailed configuration of the lead-out wiring section LD will be described later.

Moreover, the display device LCD1 is provided with a seal portion formed on the frame region FL when seen in a plan view. The seal portion is formed in a manner so as to continuously surround the periphery of the display section DP, and the substrate FS and the substrate BS shown in FIG. 2 are adhered and secured by a sealing material formed on the seal portion. In this manner, by forming the seal portion on the periphery of the display section DP, the liquid crystal layer LCL (see FIG. 3) as the display functional layer can be sealed.

Furthermore, as shown in FIG. 2, on the back side BSb of the substrate BS of the display device LCD1, a polarizing plate PL2 for polarizing light generated from a light source LS is installed. The polarizing plate PL2 is secured onto the substrate BS. On the other hand, on the front surface side FSf of the substrate FS, a polarizing plate PL1 is installed. The polarizing plate PL1 is secured onto the substrate FS.

Additionally, in FIG. 2, basic constituent parts for use in forming a display image are exemplified; however, as modification examples, other parts may be added in addition to the constituent parts shown in FIG. 2. For example, a protective film or a cover member may be attached to the front surface side of the polarizing plate PL1 as a protective layer for protecting the polarizing plate PL1 from scratches, stains or the like. Moreover, for example, an embodiment in which an optical element such as a phase-change plate or the like is bonded to the polarizing plate PL1 and polarizing plate PL2 may be used. Alternatively, a method in which optical elements are respectively formed on the substrate FS and substrate BS may be adopted.

Moreover, as shown in FIG. 3, the display device LCD1 is provided with a plurality of pixel electrodes PE and common electrodes CE that are disposed between the substrate FS and the substrate BS. The display device LCD1 of the present embodiment, which is the display device of the lateral electric field mode as described earlier, is provided with the plurality of pixel electrodes PE and common electrodes CE respectively formed on the substrate BS.

The substrate BS, as shown in FIG. 3, is provided with a base member BSg composed of a glass substrate or the like, and circuits for use in displaying an image are mainly formed on the base member BSg. The substrate BS has a front surface BSf located on the substrate FS side and a back surface BSb (see FIG. 2) located on the opposite side thereof. Moreover, on the front surface BSf side of the substrate BS, display elements such as TFT or the like and a plurality of pixel electrodes PE are formed in a matrix form.

Since the example shown in FIG. 3 shows the display device LCD1 of the lateral electric field mode (FFS mode, more specifically), the common electrodes CE are formed on the front surface side of the base member BSg possessed by the substrate BS, and covered with an insulating film (insulating layer) OC2. Moreover, the plurality of pixel electrodes PE are formed on the insulating film OC2 on the substrate FS side so as to be opposed to the common electrodes CE with the insulating film OC2 interposed therebetween.

Moreover, the substrate FS shown in FIG. 3 is a substrate having a configuration in which a color filter CF for use in forming a color display image is formed on the base member FSg composed of a glass substrate or the like, and is provided with a front surface FSf (see FIG. 2) forming the display surface side and a back surface FSb located on the opposite side of the front surface FSf thereof. Such a substrate like the substrate FS on which the color filter CF is formed is referred to as a counter substrate so as to be distinguished from the above-mentioned TFT substrate on which TFTs are formed because the substrate is made face to face with the TFT substrate with the color filter substrate or the liquid crystal layer interposed therebetween. Additionally, as a modification example relative to FIG. 3, a configuration in which a color filter CF is formed on the TFT substrate may be adopted.

On the substrate FS, a color filter CF, which is constituted by color filter pixels CFr, CFg, CFb of three colors of red (R), green (G) and blue (B) are periodically arranged on one of surfaces of the base member FSg formed of, for example, a glass substrate or the like, is formed. In the color display device, by forming sub-pixels of three colors of, for example, red (R), green (G) and blue (B) into one set, one pixel (referred to also as 1 pixel) is formed. The plurality of color filter pixels CFr, CFg, CFb on the substrate FS are disposed at positions that are mutually opposed to the respective sub-pixels having the pixel electrodes PE formed on the substrate BS.

Moreover, on each of the respective borders of the color filter pixels CFr, CFg, CFb of the respective colors, a light shielding film BM is formed. The light shielding film BM, which is referred to as a black matrix, is formed of, for example, a black resin or metal having a low reflective property. The light shielding film BM is formed into a lattice shape when seen in a plan view. In other words, the substrate FS is provided with color filter pixels CFr, CFg, CFb having the respective colors formed at aperture portions of the light shielding film BM formed into the lattice shape. Additionally, colors forming one pixel are not necessarily limited by the three colors of red (R), green (G) and blue (B). Moreover, the black matrix is not necessarily limited by the lattice shape, and may be formed into a stripe shape.

Additionally, in the present application, the region described as the display section DP or the display region is regulated as a region located inner side from the frame region FL. Moreover, the frame region FL is a region covered with the light shielding film BM for shielding light irradiated from the light source LS shown in FIG. 2. The light shielding film BM is also formed inside the display section DP; however, in the display section DP, a plurality of aperture portions are formed in the light shielding film BM. In general, among the aperture portions which are formed in the light shielding film BM and in which the color filters CF are embedded, the end portions of the aperture portion formed on the outermost frame region are defined as borders between the display section DP and the frame region FL.

Furthermore, the substrate FS is provided with a resin layer OC1 covering the color filter CF. Since the light shielding film BM is formed on each of borders between the color filter pixels CFr, CFg and CFb having the respective colors, the inner surface of the color filter CF is formed into a concavo-convex surface. The resin layer OC1 functions as a flattening film for flattening the concavo-convex surface of the inner surface of the color filter CF. Alternatively, the resin layer OC1 functions as a protective film for preventing the color filter CF from diffusing impurities toward the liquid crystal layer. By allowing the resin layer OC1 to contain a component that is cured by applying energy thereto, such as a thermosetting resin component or a photocurable resin component or the like, in its material, the resin material can be cured.

Furthermore, between the substrate FS and the substrate BS, a liquid crystal layer LCL, which forms a display image when a displaying voltage is applied between the pixel electrode PE and the common electrode CE, is installed. The liquid crystal layer LCL is designed to modulate light passing therethrough in accordance with a state of an applied electric field.

The substrate FS is also provided with an alignment film AF1 covering the resin layer OC1, which is formed on the back surface FSb forming an interface in contact with the liquid crystal layer LCL. Moreover, the substrate BS is provided with an alignment film AF2 covering the insulating film OC2 and the plurality of pixel electrodes PE, which is formed on the front surface BSf forming an interface in contact with the liquid crystal layer LCL. The alignment films AF1 and AF2 are resin films that are formed to adjust the initial alignment of liquid crystal contained in the liquid crystal layer LCL, and formed of, for example, a polyimide resin.

The display method of a color image by the display device LCD1 shown in FIG. 3 is explained, for example, in the following manner. That is, light emitted from the light source LS (see FIG. 2) is filtered by the polarizing plate PL2 (see FIG. 2), and light that has passed through the polarizing plate PL2 is made incident onto the liquid crystal layer LCL. The light made incident on the liquid crystal layer LCL is transmitted in a thickness direction (in other words, a direction from the substrate BS toward the substrate FS) of the liquid crystal layer LCL, with its polarized state being changed in accordance with the refraction index anisotropy (in other words, birefringence) of the liquid crystal, and released from the substrate FS. At this time, the liquid crystal alignment is controlled by an electric field formed by applying voltages to the pixel electrodes PE and common electrodes CE so that the liquid crystal layer LCL functions as an optical shutter. In other words, in the liquid crystal layer LCL, the transmittance of light can be controlled for each of the sub-pixels. Light that has reached the substrate FS is subjected to a color filtering process (that is, a process in which light rays having wavelengths other than a predetermined wavelength are absorbed) in the color filters formed on the substrate FS, and released from the front surface FSf. Moreover, the light released from the front surface FSf is allowed to reach a viewer VW through the polarizing plate PL1.

Moreover, as shown in FIG. 4, the seal section SL formed on the peripheral edge side of the liquid crystal layer LCL is provided with a seal member (sealing material) SLp. The liquid crystal layer LCL is sealed inside a region surrounded by the seal member SLp. That is, the seal member SLp has a function for serving as a sealing material for use in preventing leakage of the liquid crystal layer LCL. Furthermore, the seal member SLp is made tightly in contact with the back surface FSb of the substrate FS and the front surface BSf of the substrate BS so that the substrate FS and the substrate BS are adhered and secured, with the seal member SLp interposed therebetween. That is, the seal member SLp has a function serving as an adhesive member for adhering and securing the substrate FS and the substrate BS to each other.

Moreover, in the example shown in FIG. 4, the seal section SL is provided with a member PS as a member that is disposed on the periphery of the liquid crystal layer LCL and extended along the outside edge of the liquid crystal layer LCL. The member PS serves as a blocking member that blocks an alignment film AF1 from further expanding. Furthermore, the thickness of the liquid crystal layer LCL shown in FIG. 3 and FIG. 4 is extremely thin in comparison with the thickness of the substrate FS and the substrate BS. For example, the thickness of the liquid crystal layer LCL is set to about 0.1% to 10% in comparison with the thickness of the substrate FS and the substrate BS. In the example shown in FIG. 3 and FIG. 4, the thickness of the liquid crystal layer LCL is set to, for example, about 3 μm to 4 μm.

<Detailed Description of Lead-out Wiring Section>

Figure 5:
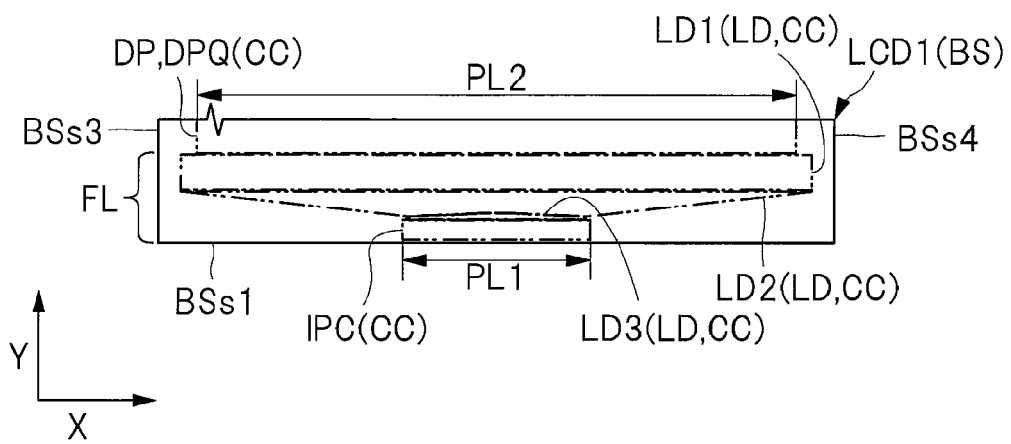
FIG. 5 is an enlarged plan view that schematically shows the layout of a lead-out wiring section shown in FIG. 1.

Next, the lead-out wiring section LD shown in FIG. 1 will be explained in detail. FIG. 5 is an enlarged plan view schematically showing the layout of the lead-out wiring section shown in FIG. 1. FIG. 6 is an enlarged plan view showing a layout example in the case when a plurality of wirings are routed by wiring layers of two layers in a lead-out wiring section shown in FIG. 1. Moreover, FIG. 7, which shows an examination example corresponding to FIG. 6, is an enlarged plan view showing a layout example in the case when a plurality of wirings are routed by a wiring layer of a single layer. Furthermore, FIG. 8, which shows another examination example corresponding to FIG. 6, is an enlarged plan view showing a layout example in the case when a plurality of wirings are routed by wiring layers of two layers. FIG. 9 is an enlarged cross-sectional view taken along the line A-A of FIG. 8. Moreover, FIG. 10 is an enlarged cross-sectional view taken along the line A-A of FIG. 6. Furthermore, FIG. 11 is an enlarged cross-sectional view showing a structural example of display elements formed in a display element section shown in FIG. 1.

Additionally, in FIG. 6 and FIG. 8, in order to easily distinguish the wiring WL1 and the wiring WL2 formed on different layers from each other, the wiring WL1 formed on the first layer is indicated by a solid line and the wiring WL2 formed on the second layer is indicated by a dotted line.

In the lead-out wiring section LD shown in FIG. 1, a plurality of wirings WL including a plurality of signal lines for transmitting a video signal to the display element section DPQ and a plurality of gate lines for transmitting a gate signal to the display element section DPQ are formed. In order to increase the number of pixels of the display device and consequently to improve the definition of a display image, the numbers of the signal lines and the gate lines need to be increased, therefore, a technique is required in which many wirings WL are disposed within a limited space. For this reason, the inventor of the present application has examined a technique in which by forming a plurality of wirings WL on a plurality of stacked wiring layers, the number of the wirings WL is increased.

First, as shown in FIG. 5, the length PL1 of the input section IPC and the length PL2 of the display element section DPQ in the X direction are different from each other. For this reason, one portion of the wiring WL (see FIG. 6) for electrically connecting the input section IPC to the display element section DPQ needs to be extended in such directions as to respectively cross the X direction and the Y direction orthogonal to the X direction. For this reason, the lead-out wiring section LD has a portion LD1 in which the plurality of wirings WL extend along the Y direction, between the display element section DPQ and the input section IPC. Moreover, the lead-out wiring section LD has a portion LD1 in which the plurality of wirings WL extend along directions crossing the Y direction and the X direction, between the display element section DPQ and the input section IPC. Furthermore, the lead-out wiring section LD has a portion LD3 in which the plurality of wirings WL extend along the Y direction, between the portion LD2 and the input section IPC.

As shown in the present embodiment, in the portion LD2 in which the plurality of wirings WL extend along directions crossing the Y direction and the X direction, in the case when the length PL1 of the input section IPC is shortened by shortening the length of the chip so as to cut costs and in the case when the distance between the side BSs1 of the substrate BS and the display section DP of the frame region FL is narrowed in order to narrow the frame edge, the distance between the adjacent wirings WL becomes smaller in the portion LD2. In other words, it is necessary to improve the wiring density in the portion LD2.

Next, the following description will examine the case where the wirings WL are routed by using the single layer as shown in the display device LCD2 shown in FIG. 7. In the case when the plurality of wirings WL are routed by using the single layer as shown in the display device LCD2, the number of the wirings WL capable of being laid out is regulated by the minimum value of the clearance between the adjacent wirings WL. For example, in the wiring layer formed based upon a designing rule in which each of the wiring width of the plurality of wirings WL1 shown in FIG. 7 is set to 4.2 μm and the clearance between the adjacent wirings WL1 is set to 5.1 μm, when the plurality of wirings WL are routed, the distance between the centers of the adjacent wirings WL1 in the portion LD2 needs to be set to 9.3 μm or more. In other words, in the case of the layout shown in FIG. 7, it is necessary to dispose the wirings WL1 with a wiring pitch of 9.3 μm or more in the portion LD2.

Next, the following description will examine the case where the wirings WL are routed by using wiring layers of two layers with an insulating film interposed therebetween as shown in the display device LCD3 shown in FIG. 8 and FIG. 9. For example, one of the wiring layers sandwiching the insulating film is the same layer as the gate electrode of the TFT, and the other wiring layer is the same layer as the source-drain electrode of the TFT. In the case when the wirings WL are routed by using the wiring layers of the two layers, as shown in FIG. 8 and FIG. 9, a wiring WL1 formed on a wiring layer L1 (see FIG. 9) of the first layer and a wiring WL2 formed on a wiring layer L2 (see FIG. 9) of the second layer are desirably installed so as not to be overlapped with each other. By installing the wiring WL1 and the wiring WL2 so as not to be overlapped with each other, it becomes possible to prevent a current flowing through the wiring WL1 and a current flowing through the wiring WL2 from interfering with each other.

Therefore, in the example of the display device LCD3, as shown in FIG. 8, the wirings WL1 and the wirings WL2 are alternately arranged when seen in a plan view. In this case, of the plurality of wirings WL1 formed on the wiring layer L1 (see FIG. 9) of the first layer, a space between the adjacent wirings WL1 can be efficiently used as a formation region of the wiring WL2; therefore, in comparison with the case in which the wirings WL are routed by using only the wiring layer L1 of the first layer, the wiring density can be improved. Additionally, the respective wirings may be formed of metal of a single layer or stacked layers of plurality of metal layers.

For example, in the example shown in FIG. 9, in the wiring layer L1, the wiring width W1 of each of the plurality of wirings WL1 is set to 4.2 μm, and the clearance between the adjacent wirings WL1 is set to 5.1 μm. Moreover, in the wiring layer L2, the wiring width W2 of each of the plurality of wirings WL2 is set to 1.8 μm, and the clearance between the adjacent wirings WL2 is set to 7.5 μm. In this case, of the plurality of wirings WL shown in FIG. 8, the distance between the centers of the adjacent wirings WL is set to about 4.7 μm when seen in a plan view. In other words, in the case of the layout shown in FIG. 8, since it is only necessary to set the wiring pitch to 4.7 μm or more in the portion LD2, the wiring density can be improved in comparison with the case of the display device LCD2 shown in FIG. 7.

On the other hand, in the case when the wirings WL are formed on each of the plurality of wiring layers as shown in the display device LCD3, the designing rule of the wiring width and the distance between the wirings, that is, the lower limit value of the wiring width and the distance between the wirings, sometimes differs for each of the wiring layers, due to reasons or the like on the manufacturing process. For example, with respect to the display element section DPQ shown in FIG. 1, a description has been given by exemplifying the formation of TFTs as the plurality of display elements. From the viewpoint of effectively forming the plurality of wiring layers of the lead-out wiring section LD shown in FIG. 8 and FIG. 9, upon forming the gate electrodes and source electrodes of the TFTs, a batch formation process is preferably used. In this case, the designing rule of the wiring width and the distance between the wirings sometimes differs for each of the wiring layers, due to the manufacturing process of the TFTs.

For example, in the case when the above-mentioned TFTs serving as the display elements have a configuration of a bottom gate system in which, as in the case of the transistor Q1 shown in FIG. 11, the gate electrode GT is formed on a lower side than the source electrode ST and the drain electrode DT, the gate electrode GT is formed on the wiring layer L1 (see FIG. 1) of the lowermost layer. Moreover, on the wiring layer L2 of the second layer, the source electrode ST and the drain electrode DT are formed. In an example shown in FIG. 11, the gate electrode GT is formed on the wiring layer L1 of the first layer, and covered with an insulating film (insulating layer) IL1 serving as a gate insulating film. The insulating film IL1 is an inorganic insulating film formed of, for example, silicon oxide or silicon nitride, or a stacked film of these. Moreover, the source electrode ST and the drain electrode DT are formed on the wiring layer L2 of the second layer formed on the insulating film IL1, and covered with an insulating film (insulating layer) IL2. The insulating film IL2 is an insulating film that functions as a protective film for the transistor Q1 and the wiring layer L2. Since the insulating film IL2 covers the transistor Q1, it is formed by an organic film having a coating property better than that of the inorganic film, and is further covered with an insulating film (insulating layer) IL3 formed of an inorganic insulating film such as silicon nitride or the like.

In the manufacturing process of the transistor Q1 shown in FIG. 11, after the gate electrode GT has been formed, a semiconductor layer SCL is formed on the insulating film IL1 that is a gate insulating film covering the gate electrode GT. The transistor of FIG. 11 is of a bottom-gate type; however, a transistor, which is of a top-gate type in which a semiconductor layer is formed on a side close to the base member BSg, and after the formation of the semiconductor layer, agate insulating film is formed, with the gate electrode being installed on the gate insulating film, is also present. Upon formation of the transistor, a heating treatment is sometimes carried out so that the wirings WL1 (see FIG. 8 and FIG. 9) to be formed on the wiring layer L1 on which the gate electrode GT is formed need to have resistance against the heating treatment in many cases. For this reason, the wiring layer L1 is sometimes formed by using a high melting-point metal material such as, for example, molybdenum (Mo) or the like. On the other hand, since the source electrode ST and the drain electrode DT can be formed after the heating treatment, a low resistivity metal material, such as, for example, aluminum or the like, can be used as the material for the wirings WL1 (see FIG. 8 and FIG. 9) to be formed on the wiring layer L2. As a result, in comparison with the wirings WL1 of the wiring layer L1, the wiring width of the wirings WL2 of the wiring layer L2 can be made narrower.

Additionally, the above-mentioned example in which mutually different metal materials are used for the wirings WL1 and the wirings WL2 is one example of reasons why the designing rules of the wiring width and the distance between wirings are different for each of the wiring layers, and for example, aluminum materials are respectively used for the wiring WL1 and the wiring WL2 in some cases. However, even if the same metal material is used for the wirings WL1 and the wirings WL2, the designing rules of the wiring thickness, the wiring width and the distance between wirings are sometimes different for each of the wiring layers due to limitation on a manufacturing process or a step coverage, or the like.

In the example shown in FIG. 9, the wirings WL2 are aluminum wirings, and as a designing rule, the distance between wirings is preferably set to, for example, 2.5 μm or more. Therefore, in the case when all the wirings WL are disposed on the wiring layer L2 of the second layer shown in FIG. 9, the distance between the centers of the adjacent wirings WL2, that is, the wiring pitch, is set to about 4.3 μm. In other words, in the case of the example shown in FIG. 9, since the wirings WL1 and the wirings WL2 are alternately arranged when seen in a plan view, the wiring density is lowered in comparison with the configuration in which all the wirings WL are installed on the wiring layer L2 of the second layer. In this manner, it has been found that, in the case when the designing rules of the wiring width and the distance between wirings are different for each of the wiring layers, if the wirings WL1 and the wirings WL2 are simply alternately arranged, the wiring density is consequently lowered in some cases, in comparison with the configuration in which the wirings WL are routed on the wiring layer L2 of the second layer as a single layer.

Therefore, the inventor of the present application has further carried out examinations on the configuration by which the wiring density is enhanced in the case when wirings WL are disposed respectively on a plurality of wiring layers, and have found the configuration of the present embodiment shown in FIG. 6 and FIG. 10. That is, the display device LCD1 is designed so that the number of the wirings WL2 to be formed on the wiring layer L2 in which the wiring density can be improved comparatively more easily is made greater than the number of the wirings WL1 to be formed on the wiring layer L1 in which the wiring density is hardly improved comparatively.

As shown in FIG. 6 and FIG. 10, the lead-out wiring section LD (see FIG. 6) provided in the display device of the present embodiment has the plurality of wiring layers composed of the wiring layers L1 (see FIG. 10) and the wiring layers L2 (see FIG. 10). Moreover, on the wiring layer L1, the plurality of wirings WL1, each having a wiring width of W1, are formed, and on the wiring layer L2, the plurality of wirings W2, each having a wiring width of W2 narrower than the wiring width W1, are formed. That is, the wiring layer L2 is a wiring layer in which the wiring density can be improved comparatively more easily in comparison with the wiring layer L1. The fact that as described above, the plurality of wirings WL1 and the plurality of wirings WL2 having mutually different wiring widths are formed on the plurality of wiring layers is the same as that of the display device LCD3 shown in FIG. 8 and FIG. 9.

Moreover, in the case of the display device LCD3 shown in FIG. 8 and FIG. 9, since the wirings WL1 and the wiring WL2 are alternately arranged, the number of the wirings WL1 and the number of the wirings WL2 are the same. On the other hand, in the case of the display device LCD1 shown in FIG. 6 and FIG. 10, a plurality of wirings WL2 (two in FIG. 6) are formed between the adjacent wirings WL1 when seen in a plan view. Therefore, the number of the plurality of wirings WL2 formed on the wiring layer L2 shown in FIG. 10 is greater than the number of the plurality of wirings WL1 formed on the wiring layer L1. That is, in the display device LCD1 of the present embodiment, since the number of the wirings WL2 formed on the wiring layer L2 in which the wiring density can be improved comparatively more easily is made greater than the number of the wirings WL1 formed on the wiring layer L1 in which the wiring density is hardly improved comparatively, the wiring density of the plurality of wirings WL can be improved.

In the example shown in FIG. 10, the wiring width W2 of the wirings WL2 is preferably set to 1.8 μm, and the distance between wirings L2 is preferably set to, for example, 2.5 μm or more. On the other hand, the wiring width W1 of the wirings WL1 is preferably set to 4.2 μm, and the distance between wirings L1 is preferably set to, for example, 5.1 μm or more. However, in the example shown in FIG. 10, in order to arrange two wirings WL2 between the adjacent wirings WL1 when seen in a plan view, the distance between wirings of the wiring layer L1 is set to 7.0 μm. In this case, since three wirings WL are disposed within a range of 11.2 μm when seen in a plan view, the distance between the centers of the adjacent wirings WL, that is, the wiring pitch, is set to about 3.7 μm. Therefore, in comparison with any one of the cases of the display device LCD2 shown in FIG. 7, the display device LD3 shown in FIG. 8 and the arrangement in which the wirings WL are routed by using the wiring layer L2 of the second layer as a single layer shown in FIG. 9, it becomes possible to improve the wiring density.

In the above description, the width of the wirings WL is used as an index representing the easiness of improving the wiring density. However, as the index representing the easiness of improving the wiring density, the clearance between adjacent wirings WL1 on the wiring layer L1 and the clearance between adjacent wirings WL2 on the wiring layer L2 may be used for indicating the index.

In other words, on the wiring layer L1 shown in FIG. 10, the plurality of wirings WL1 are formed with a clearance S1. Moreover, on the wiring layer L2, the plurality of wirings WL2 are formed with a clearance S2 that is smaller than the clearance S1. Additionally, in the example shown in FIG. 10, although the clearance S2 and a clearance S4 are included in the clearance of the plurality of wirings WL2, each of the clearance S2 and the clearance S4 is smaller than the clearance S1. In this manner, in the case when the clearances between the adjacent wirings WL are different for each of the wiring layers, the wiring layer having a smaller clearance is more easily allowed to have an improved wiring density. That is, in the example shown in FIG. 10, the wiring layer L2 is more easily allowed to have the improved wiring density than the wiring layer L1.

Moreover, as described above, within the lead-out wiring section LD shown in FIG. 5, a portion whose wiring density needs to be particularly improved is the portion LD2 in which the plurality of wirings WL (see FIG. 6) are extended in such directions as to cross the X direction and the Y direction. For example, as shown in FIG. 6, the portion LD1 and the portion LD3 in which the plurality of wirings WL extend along the Y direction have a lower wiring density in comparison with that of the portion LD2. Therefore, in a portion to be connected to the input section IPC, the plurality of wirings WL are respectively installed on, for example, the wiring layer L1 of the first layer in an integrated manner.

A method for electrically connecting the wiring layer L1 of the first layer to the wiring layer L2 of the second layer is exemplified in FIG. 12. FIG. 12 is an enlarged cross-sectional view showing a structural example in which the wiring on the wiring layer of the first layer and the wiring on the wiring layer of the second layer, shown in FIG. 6 and FIG. 10, are electrically connected with each other.

In the example shown in FIG. 12, an opening OP1 is formed on the insulating film IL1 covering the wiring layer L1 of the first layer, and in the opening OP1, the wiring WL1 is exposed from the insulating layer IL1. Moreover, one portion of the wiring WL2 formed on the wiring layer L2 of the second layer is embedded in the opening OP1 formed on the insulating film IL1, and is electrically connected to the wiring WL1. In this manner, by forming the opening OP1 on one portion of the insulating film IL1 covering the wiring layer L1, the wiring WL2 of the wiring layer L2 of the second layer and the wiring WL1 of the wiring layer L1 of the first layer can be electrically connected with each other. Additionally, in FIG. 12, the example in which the plurality of wiring layers are integrally installed on the wiring layer L1 of the first layer is shown; however, as a modification example, those layers may be integrally installed, for example, on the wiring layer L2 of the second wiring layer L2.

Moreover, as shown in FIG. 12, the opening OP1 for use in electrically connecting the wiring WL1 to the wiring WL2 each of which is formed on different wiring layers is preferably formed in the portion LD3 shown in FIG. 6. Among the portion LD1, the portion LD2 and the portion LD3, in the portion LD3 that is closest to the input section IPC, by distributing wiring routes to the plurality of wiring layers, the wiring density can be improved in the portion LD2.

MODIFICATION EXAMPLE

Next, with respect to modification examples relating to the above-mentioned embodiment, typical modification examples are exemplified and explained.

First Modification Example

In FIG. 6 and FIG. 10, as an example of the embodiment in which wirings are respectively formed on the plurality of wiring layers, descriptions have been given on a structural example in which a plurality of wirings WL are routed by using wiring layers of two layers. In the present first modification example, a description will be given to a structural example in which a plurality of wirings WL are routed by using wiring layers of three layers. FIG. 13 is an enlarged plan view showing a layout example which is a modification example relating to FIG. 6, and in which a plurality of wirings WL are routed by using wiring layers of three layers. Moreover, FIG. 14 is an enlarged cross-sectional view taken along the line A-A of FIG. 13. Additionally, in FIG. 13, in order to easily distinguish the wiring WL1, the wiring WL2 and the wiring WL3 formed on different layers, the wiring WL1 formed on the first layer is indicated by a solid line, the wiring WL2 formed on the second layer is indicated by a dotted line, and the wiring WL3 formed on the third layer is indicated by an alternate long and short dash line.

A display device LCD4 shown in FIG. 13 and FIG. 14 differs from the display device LCD1 shown in FIG. 6 in that it has a wiring WL3 that is formed on a wiring layer L3 of the third layer. The wiring layer L3 of the third layer is formed on the insulating film IL2 covering the wiring layer L2, and covered with an insulating film IL3 as an inorganic insulating film. Moreover, in the example shown in FIG. 14, the wiring width W3 of the wiring WL3 is wider than the wiring width W2 of the wiring WL2 of the wiring layer L2 of the second layer. That is, the display device LCD4 of the present first modification example has different designing rules for the respective wiring layers. More specifically, the wiring layer L2 has its wiring density most easily improved relatively, and the wiring layer L1 and the wiring layer L3 have their wiring densities hardly improved in comparison with the wiring layer L2.

Even in the case when the plurality of wirings WL are routed by using the wiring layers of the three layers having different designing rules for the wiring layout as in the case of the present first modification example, the same consideration as that of the above-mentioned display device LCD1 may be given thereto. That is, in the display device LCD3, the number of the wirings WL2 to be formed on the wiring layer L2 in which the wiring density can be improved comparatively more easily is made greater than the number of the wirings WL1 to be formed on the wiring layer L1 in which the wiring density is hardly improved comparatively and the number of the wirings WL3 to be formed on the wiring layer L3 in which the wiring density is also hardly improved. With this arrangement, the wiring density of the plurality of wirings WL can be improved.

In the example shown in FIG. 14, the wiring width W1 of each of the wirings WL1 is set to 4.2 μm, and the clearance S1 of the wirings WL1 of the wiring layer L1 is preferably set to, for example, 5.1 μm or more. Moreover, the wiring width W2 of each of the wirings WL2 is set to 1.8 μm, and the clearance S2 of the wirings WL2 of the wiring layer L2 is preferably set to, for example, 2.5 μm or more. Furthermore, the wiring width W3 of each of the wirings WL3 is set to 4.2 μm, and the clearance S3 of the wirings WL3 of the wiring layer L3 is preferably set to, for example, 5.1 μm or more.

However, in the example shown in FIG. 14, in order to allow the adjacent wirings WL not to be overlapped with each other when seen in a plan view, the clearance S1 of the wirings WL1 of the wiring layer L1 is set to 9.7 μm, the clearance S2 of the wirings WL2 of the wiring layer L2 is set to 5.2 μm, and the clearance S3 of the wirings WL3 of the wiring layer L3 is set to 9.7 μm.

In this case, since four wirings WL are disposed within a range of 13.9 μm when seen in a plan view, the distance between the centers of the adjacent wirings WL, that is, the wiring pitch, is set to about 3.5 μm. Therefore, in comparison with the display device LCD1 shown in FIG. 1, it becomes possible to further improve the wiring density.

Moreover, in the above description, the width of the wirings WL is used as an index representing the easiness of improving the wiring density. However, as the index representing the easiness of improving the wiring density, the clearance between adjacent wirings WL1 on the wiring layer L1 and the clearance between adjacent wirings WL2 on the wiring layer L2 may be used for indicating the index.

In other words, of the plurality of wirings WL2 formed on the wiring layer L2, the clearance S2 of the adjacent wirings WL2 is smaller than the clearance S1 of the adjacent wirings WL1 on the wiring layer L1 and the clearance S3 of the adjacent wirings WL3 on the wiring layer L3. Therefore, the wiring layer L2 has its wiring density most easily improved relatively, and the wiring layer L1 and the wiring layer L3 have their wiring densities hardly improved in comparison with the wiring layer L2.

Except for the above-mentioned differences, the display device LCD4 shown in FIG. 13 and FIG. 14 is the same as the display device LCD1 shown in FIG. 6 and FIG. 10. Therefore, overlapped explanations will be omitted.

Second Modification Example

In the above-mentioned display device LCD1 shown in FIG. 6, display device LCD2 shown in FIG. 7, display device LCD3 shown in FIG. 8 and display device LCD4 shown in FIG. 13, descriptions have been given to embodiments in which wirings WL formed on the respective wiring layers are not overlapped with each other. However, in an attempt to improve the wiring density, a configuration in which the wirings WL formed on different wiring layers are partially overlapped with each other makes it possible to further improve the wiring density. On the other hand, in the case of the configuration in which portions of wirings WL formed on different wiring layers are overlapped with each other in the thickness direction, there are concerns that the respective signal lines might interfere with each other to cause noises, that signals might be adversely affected by a parasitic capacitance between wirings, and that the wirings are short-circuited due to a defect of the insulating film. Therefore, in the present second modification example, descriptions will be given to a technique by which even in the configuration in which the wirings WL formed on different wiring layers are partially overlapped with each other in the thickness direction, it is possible to reduce influences from noises due to the overlapped portions.

FIG. 15, which shows a modification example relative to FIG. 13, is an enlarged plan view showing a layout example in the case when a plurality of wirings are partially overlapped with each other in the thickness direction. Moreover, FIG. 16 is an enlarged cross-sectional view taken along the line A-A of FIG. 15.

A display device LCD5 shown in FIG. 15 and FIG. 16 is different from the display device LCD4 shown in FIG. 13 in that the wiring WL3 formed on the third wiring layer L3 and the wiring WL1 formed on the first wiring layer L1 are overlapped with each other.

Moreover, as shown in FIG. 16, the thickness TH2 of the insulating film IL2 covering the wiring layer L2 is made thicker than the thickness TH1 of the insulating film IL1 covering the wiring layer L1. Since the insulating film IL1 is compatibly used as the gate insulating film of the transistor Q1 shown in FIG. 11, it becomes difficult to drive the transistor Q1 when the thickness TH1 is extremely large. On the other hand, from the viewpoint of positively covering the source electrode ST and the drain electrode DT, the insulating film IL2 tends to become thicker. In the example shown in FIG. 16, the thickness of the insulating film IL1 is set to be smaller than 1 μm, and the thickness of the insulating film IL2 is set to, for example, about 2 μm.

In the case when noises or the like between the respective wiring layers are taken into consideration, as the distance between the wiring layers becomes farther, the influences therefrom can be reduced. Therefore, between the wiring layer L1 and the wiring layer L2 that are formed with a comparatively thin insulating film IL1 interposed therebetween, the influences from the mutual wirings WL tend to become higher. In contrast, between the wiring layer L2 and the wiring layer L3 that are formed with a comparatively thick insulating film IL2 formed of an organic insulating film or the like, interposed therebetween, the influences from the mutual wirings WL can be easily reduced.

As described above, when the influences of noises between the respective wiring layers and the improvement of the wiring density are taken into consideration, the following configuration is desirably adopted. That is, the plurality of wirings WL1 of the wiring layer L1 and the plurality of wirings WL2 of the wiring layer L2, which cause relatively great noise influences, are preferably made so as not to be overlapped with each other. In this case, the plurality of wirings WL3 that are formed on the insulating film IL2 having the thickness TH2 thicker than the thickness TH1 may be overlapped with the plurality of wirings WL1 or portions of the plurality of wirings WL1.

Additionally, in the example of FIG. 16, the wiring WL3 and the wiring WL2 are not overlapped with each other; however, when the thickness TH2 of the insulating film IL2 is sufficiently thick so that influences from noises and parasitic capacitance are low and the possibility of a short-circuit between wirings is low, the wiring WL3 and the wiring WL2 may be overlapped with each other.

As shown in the example of FIG. 16, in the case when the wiring WL3 and the wiring WL2 are not overlapped with each other, the clearance between the wiring WL1 and the wiring WL3 that are mutually overlapped with each other is indicated by the total value of the thickness TH1 and the thickness TH2; therefore, the influences of noises can be in particular reduced.

As shown by the display device LCD5 of the present second modification example, in the case when portions of the wiring WL formed on the plurality of wiring layers are designed so as to be overlapped with each other, the wiring density of the plurality of wirings WL can be further improved in comparison with that of the display device LCD4 shown in FIG. 13.

In the example shown in FIG. 16, the wiring width W1 of the wirings WL1 is preferably set to 4.2 μm, and the clearance S1 of the wirings WL1 of the wiring layer L1 is preferably set to, for example, 5.1 μm or more. Moreover, the wiring width W2 of the wirings WL2 is preferably set to 1.8 μm, and the clearance S2 of the wirings WL2 of the wiring layer L2 is preferably set to, for example, 2.5 μm or more. Furthermore, the wiring width W3 of the wirings WL3 is preferably set to 4.2 μm, and the clearance S3 of the wirings WL3 of the wiring layer L3 is preferably set to, for example, 5.1 μm or more.

However, in the example shown in FIG. 16, in an attempt to allow the plurality of wirings WL2 and the plurality of wirings WL1 not to be overlapped with each other when seen in a plan view, the clearance S1 of the wirings WL1 of the wiring layer L1 is set to 7.0 μm, the clearance S2 of the wirings WL2 of the wiring layer L2 is set to 2.5 μm, and the clearance S3 of the wirings WL3 of the wiring layer L3 is set to 7.0 μm.

In this case, since four wirings WL are disposed within a range of 9.2 μm when seen in a plan view, the distance between the centers of the adjacent wirings WL, that is, the wiring pitch, is set to about 2.3 μm. Therefore, in comparison with the display device LCD4 shown in FIG. 13, the wiring density can be further improved.

Except for the above-mentioned differences, the display device LCD5 shown in FIG. 15 and FIG. 16 is the same as the display device LCD4 shown in FIG. 13 and FIG. 14. Therefore, overlapped descriptions will be omitted.

Third Modification Example

In the case when the wirings WL3 are formed on the insulating film IL2 as shown in the display device LCD4 explained in the aforementioned first modification example and the display device LCD5 explained in the aforementioned second modification example, the insulating film IL2 needs to be formed on the region where the wirings WL3 are formed.

In this case, there is a concern that moisture might easily invade to an interface between the insulating film IL2 prepared as an organic insulating film and the insulating film IL1 prepared as an inorganic insulating film from the outside of the display device. For this reason, from the viewpoint of preventing moisture from invading to the display section DP (see FIG. 1), one portion of the insulating film IL2 is removed, and slits SLT are preferably formed therein as shown in FIG. 17. FIG. 17 is an enlarged cross-sectional view showing a structural example of a portion in which in the display device as shown in FIG. 13 and FIG. 15, wirings of a plurality of wiring layers are electrically connected with each other. The slits SLT shown in FIG. 17 are grooves formed so as to extend along the X direction shown in FIG. 1, and at the apertures of the slits SLT, the insulating film IL1 as the base layer is exposed.

In order to form the slits SLT as shown in FIG. 17, within a region that avoids the slits, the wirings WL3 of the wiring layer L3 of the third layer and the wirings WL2 of the wiring layer L2 need to be electrically connected.

On the other hand, as described earlier, of the lead-out wiring sections LD shown in FIG. 5, a section in which the wiring density needs to be in particular improved is the section LD2. Therefore, as shown in FIG. 17, the formation place of the slits SLT is preferably set to the section LD3 of the lead-out wiring sections LD. Moreover, the wirings WL3 of the wiring layer L3 of the third layer and the wirings WL2 of the wiring layer L2 are preferably connected with each other at the section LD3.

In the foregoing, the invention made by the inventor of the present invention has been concretely described based on the embodiments. However, it is needless to say that the present invention is not limited to the foregoing embodiments and various modifications and alterations can be made within the scope of the present invention. Moreover, the wiring layer L3 can be compatibly used as metal for use in lowering the resistivity of the common electrode in the case when the display device is of a lateral electric field type. When the wiring layer L3 is formed by using a low resistivity metal such as aluminum, wirings may be formed with a wiring width and a wiring interval that are the same as those of the wirings WL2. Alternatively, depending on the film thickness of the wiring layer L3, the wirings may be formed with a wiring width slightly thicker than that of the wirings WL2. Even in such a configuration, the invention of the present application can be adopted.

Moreover, depending on characteristics of the insulating film L1, the wirings WL1 and the wirings WL2 may be partially superimposed with each other. In the same manner, in the case when the insulating film L2 is formed by an inorganic film, the wirings WL2 and the wirings WL3 may be superimposed with each other. Thus, a higher density can be achieved.

Moreover, in a thin-film transistor of the top-gate type, light shielding metal for shielding light from the backlight is sometimes used between the backlight and the semiconductor layer. This light shielding metal may be used in place of the wiring layer WL3. Furthermore, the light shielding metal may be used as a fourth wiring layer. Additionally, the above-mentioned wiring layer is assumed to be used for a wiring to be connected to the source electrode or the drain electrode of a transistor in the display region; however, the wiring layer may be applied to a wiring to be connected to the gate of a thin-film transistor, or a wiring for supplying clock signals, power, etc., or a wiring for supplying signals to a semiconductor chip. The aforementioned embodiments have disclosed a display device using a liquid crystal layer as a display functional layer; however, the present invention is not intended to be limited thereby. For example, the above-mentioned technique may be applied to a lead-out wiring section of a display device of a so-called organic EL type in which light emitting elements formed of an organic compound are used as a display functional layer.

In the category of the idea of the present invention, a person with ordinary skill in the art can conceive various modified examples and revised examples, and such modified examples and revised examples are also deemed to belong to the scope of the present invention. For example, the examples obtained by appropriately making the additions, deletions or design changes of components or the additions, deletions or condition changes of processes to respective embodiments described above by a person with ordinary skill in the art also belong to the scope of the present invention as long as they include the gist of the present invention.

The present invention can be applied to a display device and an electronic apparatus with a display device assembled therein.

What is claimed is:
1. A display device comprising:
a substrate having a first surface; and
a display functional layer,
wherein the first surface has a display element section on which a plurality of display elements for driving the display functional layer are arranged, an input section to which a signal to be supplied to the display element section is input, and a lead-out wiring section for electrically connecting the display element section to the input section, the lead-out wiring section includes a plurality of wiring layers stacked with an insulating film interposed therebetween, the plurality of wiring layers include a first wiring layer on which a plurality of first wirings, each having a first wiring width, are formed, and a second wiring layer on which a plurality of second wirings, each having a second wiring width narrower than the first wiring width, are formed, and the number of the plurality of second wirings is greater than the number of the plurality of first wirings.

2. The display device according to claim 1, wherein the first surface of the substrate has a first side extending along a first direction, a second side positioned on the opposite side of the first side, a third side extending along a second direction that is orthogonal to the first direction and a fourth side positioned on the opposite side of the third side, the input section and the lead-out wiring section are formed from the first side in this order between the first side and the display element section of the substrate, and the length of the input section in the first direction is shorter than the length of the display element section in the first direction.

3. The display device according to claim 1, wherein the first surface of the substrate has a first side extending along a first direction, a second side positioned on the opposite side of the first side, a third side extending along a second direction that is orthogonal to the first direction, and a fourth side positioned on the opposite side of the third side, the lead-out wiring section includes:

a first portion on which, between the display element section and the input section, the plurality of lead-out wirings including the plurality of first wirings and the plurality of second wirings extend along the second direction;

a second portion on which, between the first portion and the input section, the plurality of lead-out wirings extend along a third direction crossing the second direction and the first direction; and a third portion on which, between the second portion and the input section, the plurality of lead-out wirings extend along the second direction, and the plurality of first wirings and the plurality of second wirings are not overlapped with each other when seen in a plan view.

4. The display device according to claim 3, wherein, at the second portion of the lead-out wiring section, the plurality of first wirings are arranged with a first clearance, and the plurality of second wirings are arranged with a second clearance that is smaller than the first clearance.

5. The display device according to claim 3, wherein, when seen in a plan view, among the plurality of first wirings, the plurality of second wirings are arranged between the adjacent first wirings.

6. The display device according to claim 1, wherein each of the plurality of display elements arranged in the display element section is a transistor having a gate electrode, and the gate electrode is formed on the same layer as the first wiring layer.

7. The display device according to claim 1, wherein the plurality of first wirings and the plurality of second wirings are formed of metal materials of mutually different kinds.

8. The display device according to claim 1, wherein the plurality of wiring layers further include a third wiring layer on which a plurality of third wirings, each having a third wiring width that is wider than the second wiring width, are formed, and the number of the plurality of second wirings is greater than the number of the plurality of third wirings.

9. The display device according to claim 8, wherein a first insulating film is formed between the first wiring layer and the second wiring layer, and a second insulating film thicker that is than the first insulating film is formed between the second wiring layer and the third wiring layer, when seen in a plan view, the plurality of first wirings and the plurality of second wirings are not overlapped with each other, and the plurality of third wirings are partially overlapped with the plurality of first wirings and the plurality of second wirings.

10. The display device according to claim 8, wherein when seen in a plan view, the plurality of first wirings and the plurality of second wirings are not overlapped with each other and the plurality of second wirings and the plurality of third wirings are not overlapped with each other, and the plurality of third wirings are overlapped with the plurality of first wirings.

11. The display device according to claim 8, wherein the first surface of the substrate has a first side extending along a first direction, a second side positioned on the opposite side of the first side, a third side extending along a second direction that is orthogonal to the first direction and a fourth side positioned on the opposite side of the third side, the lead-out wiring section includes:

a first portion on which, between the display element section and the input section, a plurality of lead-out wirings, which include the plurality of first wirings, the plurality of second wirings and the plurality of third wirings, the first portion extending along the second direction;

a second portion on which, between the first portion and the input section, the plurality of lead-out wirings extend along a third direction crossing the second direction and the first direction; and a third portion on which, between the second portion and the input section, the plurality of lead-out wirings extend along the second direction, a first insulating film as an inorganic insulating film is formed between the first wiring layer and the second wiring layer, a second insulating film as an organic insulating film is formed between the second wiring layer and the third wiring layer, and, on the third portion of the lead-out wiring section, an opening extending along the first direction is formed in a manner so as to penetrate the second insulating layer in a thickness direction thereof.

12. A display device comprising:

a substrate having a first surface;

a display functional layer formed on the first surface of the substrate; and a circuit section formed on the first surface of the substrate so as to drive the display functional layer, wherein the circuit section includes a display element section on which a plurality of display elements are arranged at a position overlapped with the display region on which the display functional layer is formed, an input section for transmitting a signal for driving the display functional layer to the display element section, and a lead-out wiring section for electrically connecting the display element section to the input section, and the lead-out wiring section includes a plurality of stacked wiring layers, the plurality of wiring layers include a first wiring layer on which a plurality of first wirings are formed with a first clearance, and a second wiring layer on which a plurality of second wirings are formed at a second clearance that is smaller than the first clearance, and the number of the plurality of second wirings is greater than the number of the plurality of the first wirings.

* * * * *